(12) United States Patent
Ugaji et al.

(10) Patent No.: US 8,399,129 B2
(45) Date of Patent: Mar. 19, 2013

(54) NEGATIVE ELECTRODE FOR LITHIUM SECONDARY BATTERY, AND LITHIUM SECONDARY BATTERY INCLUDING THE SAME

(75) Inventors: Masaya Ugaji, Osaka (JP); Masaki Hasegawa, Osaka (JP); Taisuke Yamamoto, Nara (JP); Keisuke Ohara, Osaka (JP); Yasutaka Kogetsu, Osaka (JP); Takuhiro Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 1168 days.

(21) Appl. No.: 12/297,836

(22) PCT Filed: Oct. 2, 2007

(86) PCT No.: PCT/JP2007/069257
§ 371 (c)(1),
(2), (4) Date: Oct. 20, 2008

(87) PCT Pub. No.: WO2008/050586
PCT Pub. Date: May 2, 2008

(65) Prior Publication Data
US 2009/0176158 A1 Jul. 9, 2009

(30) Foreign Application Priority Data
Oct. 19, 2006 (JP) .................................. 2006-284918

(51) Int. Cl.
*H01M 4/02* (2006.01)
*H01M 4/36* (2006.01)
(52) U.S. Cl. ...... 429/220; 429/129; 429/143; 429/218.1
(58) Field of Classification Search .................. None
See application file for complete search history.

(56) References Cited

U.S. PATENT DOCUMENTS

| | | |
|---|---|---|
| 6,800,400 B2 | 10/2004 | Ota et al. |
| 7,309,548 B2 | 12/2007 | Ota et al. |
| 8,080,334 B2 | 12/2011 | Kogetsu et al. |
| 2005/0064291 A1 | 3/2005 | Sato et al. |

(Continued)

FOREIGN PATENT DOCUMENTS

| | | |
|---|---|---|
| CN | 1677717 A | 10/2005 |
| CN | 1780036 A | 5/2006 |

(Continued)

OTHER PUBLICATIONS

Machine Translation of JP 2003-17040 dated Jan. 17, 2003.*

(Continued)

*Primary Examiner* — Ula C. Ruddock
*Assistant Examiner* — Alix Echelmeyer
(74) *Attorney, Agent, or Firm* — McDermott Will & Emery LLP

(57) ABSTRACT

A negative electrode for a lithium secondary battery of the present invention includes a current collector and a negative electrode active material layer carried on the current collector. The negative electrode active material layer includes a plurality of columnar particles. The current collector has a surface including a depression and a plurality of projected regions defined by the depression. The projected regions carry the columnar particles. Further, the present invention relates to a lithium secondary battery using the foregoing negative electrode. According to the present invention, it is possible to provide a high-capacity negative electrode excellent mainly in cycle characteristics for a lithium secondary battery, and a lithium secondary battery including the same.

15 Claims, 12 Drawing Sheets

U.S. PATENT DOCUMENTS

| | | |
|---|---|---|
| 2005/0221189 A1 | 10/2005 | Yoshida et al. |
| 2006/0110661 A1 | 5/2006 | Lee et al. |
| 2007/0031733 A1* | 2/2007 | Kogetsu et al. ............... 429/245 |
| 2009/0104528 A1 | 4/2009 | Takahashi et al. |

FOREIGN PATENT DOCUMENTS

| | | |
|---|---|---|
| JP | 2002-319431 | 10/2002 |
| JP | 2003-017040 | 1/2003 |
| JP | 2003-303586 | 10/2003 |
| JP | 2004-127561 | 4/2004 |
| JP | 2005-108522 | 4/2005 |
| JP | 2005-196970 | 7/2005 |
| JP | 2005-209533 A | 8/2005 |
| JP | 2005-353582 | 12/2005 |
| JP | 2006-073212 | 3/2006 |
| JP | 2007-194076 | 8/2007 |
| WO | WO 2006/080265 A1 | 8/2006 |
| WO | WO 2007/015419 A1 | 2/2007 |
| WO | WO 2007/052803 A1 | 5/2007 |

OTHER PUBLICATIONS

Machine Translation of JP 2003-303586 dated Oct. 24, 2003.*
Translation in part of the previously-cited Chinese Office Action issued in Chinese Patent Applicaton No. 2007 80018249.3 dated Jun. 1, 2010.
Translation in part of the previously cited Korean Office Action issued in Korean Patent Application No. 10-2008-7027883 dated Jan. 17, 2011.
Robbie, et al. (1998). Advanced techniques for glancing angle deposition. *J Vac Sci Technol B*, 16(3), 1115-1122.
Extended European Search Report issued in European Patent Application No. 07828997.2, dated Jan. 3, 2012.

* cited by examiner

NEGATIVE ELECTRODE FOR LITHIUM SECONDARY BATTERY, AND LITHIUM SECONDARY BATTERY INCLUDING THE SAME

RELATED APPLICATIONS

This application is the US National Phase under 35 U.S.C. §371 of International Application No. PCT/JP2007/069257 filed on Oct. 20, 2007, which claims the benefit of Japanese Application No. JP2006-284918 filed on Oct. 19, 2006, the disclosures of which Applications are incorporated by reference herein.

TECHNICAL FIELD

The present invention relates to lithium secondary batteries and specifically relates to the structures of negative electrode current collectors and negative electrode active material layers.

BACKGROUND ART

In recent years, in association with the development in portable equipment such as personal computers and mobile phones, the demands for batteries as power sources thereof have been increased. Such batteries for use in the foregoing applications are required to be used at normal temperature and are expected to have a high energy density and excellent cycle characteristics.

In order to meet this expectation, new active materials with high capacity for use in a positive electrode or a negative electrode have been developed. The most promising among these is a battery in which a simple substance of silicon (Si) or tin (Sn), or alternatively, an oxide or alloy thereof capable of providing an extremely high capacity is used as a negative electrode active material.

However, for example, in a battery in which a material containing silicon is used as a negative electrode active material, there is a problem in that the deformation of the negative electrode occurs in association with repeated charge and discharge. Specifically, during charge and discharge, insertion and extraction of lithium (Li) causes the negative electrode active material to expand and contract greatly. The repeated charge and discharge, therefore, causes the negative electrode to warp severely, which may result in wrinkles on the current collector, and a cut in the current collector. Moreover, a space is produced between the negative electrode and the separator, causing the charge-discharge reaction to proceed unevenly. As a result, the battery performance is deteriorated.

In order to solve the problem as described above, one proposal suggests that the negative electrode active material be provided with a space for relieving expansion stress of the active material. This proposal intends to reduce warps or waves of the negative electrode and suppress the deterioration of the cycle characteristics.

For example, Patent Document 1 suggests forming columnar particles of silicon on a current collector.

Patent Document 2 suggests arranging an active material capable of alloying with lithium regularly on a current collector in a predetermined pattern.

Patent Document 3 suggests forming a thin film electrode made of silicon, tin, or the like on a current collector with projections and depressions and then flattening the projections and depressions to form reticulate cracks on the thin film.

Patent Document 4 suggests allowing columnar particles composing a negative electrode active material to be slanted with respect to a direction normal to the surface of a current collector.

Patent Document 1: Japanese Laid-Open Patent Publication No. Patent Document 2: Japanese Laid-Open Patent Publication No. 2004-127561
Patent Document 3: Japanese Laid-Open Patent Publication No.
Patent Document 4: Japanese Laid-Open Patent Publication No.

DISCLOSURE OF THE INVENTION

Problems to Be Solved by the Invention

In Patent Documents 1 to 3, a negative electrode active material layer composed of columnar particles standing upright on the current collector along a direction normal thereto is formed. In such a negative electrode, the ratio of an area of an exposed portion of the negative electrode current collector opposing to the positive electrode active material layer is greater than the ratio of an area of the negative electrode active material opposing to the positive electrode active material layer. For this reason, much of the positive electrode active material is not opposed to the negative electrode active material but is opposed to an exposed portion of the negative electrode current collector. Accordingly, lithium, which is supplied from the positive electrode active material to the negative electrode during charge, is not absorbed in the negative electrode active material but readily precipitated on the exposed portion of the negative electrode current collector. As a result, during discharge, lithium is not efficiently desorbed from the negative electrode, and therefore, the charge-discharge efficiency is reduced.

In Patent Document 4, since the negative electrode has slanted columnar particles, the utilization rates of the positive electrode active material and the negative electrode active material are improved. Therefore, in terms of the capacity retention rate, the negative electrode of Patent Document 4 is excellent as compared with the negative electrodes of Patent Documents 1 to 3. However, even with slanted columnar particles, if the particle size of the columnar particles is increased, the particles become adhered to each other, causing the negative electrode to warp severely when the active material is expanded during charge, which may results in wrinkles on the current collector or a cut in the current collector. When this occurs, only by repeating a charge-discharge cycle several times, the negative electrode may be deteriorated.

In view of the above, the present invention intends to provide a high-capacity negative electrode excellent mainly in cycle characteristics for use in a lithium secondary battery, and a lithium secondary battery including the same.

Means for Solving the Problems

A negative electrode for a lithium ion secondary battery of the present invention includes a current collector and a negative electrode active material layer, wherein the negative electrode active material layer includes a plurality of columnar particles. The current collector includes a depression or a groove (hereinafter simply referred to as a "depression") and a plurality of projected regions defined by the depression. The projected regions carry the columnar particles. The surface of the current collector has a depression and a plurality of projected regions as described above, but visually, it looks flat.

For this reason, a direction normal to the current collector is uniquely determined.

In a region on the current collector on which the active material layer is carried, it is preferable that a ratio of an area of the projected regions relative to a total of the area of the projected regions and an area of the depression is 10 to 30%. The "area" as used herein refers to an area determined by viewing the current collector from above (or in the top view).

In a line segment drawn on the surface of the current collector such that a ratio of a total length of portions overlapping with the projected regions is maximized, it is preferable that the total length is 35 to 60% of a full length of the line segment.

It is preferable that a distance L between projected regions adjacent to each other along a direction perpendicular to a maximum diameter $W_a$ of the projected regions, and a height H of the projected regions satisfy the following equation:

$$2 \leq (L/H) \leq 6.$$

It is preferable that a maximum diameter $W_a$ of the projected regions and a maximum diameter $W_b$ in the direction perpendicular to the maximum diameter $W_a$ satisfy the following equation:

$$1 \leq (W_a/W_b) \leq 4.$$

In one embodiment of the present invention, it is preferable that the plurality of projected regions are arranged along a plurality of first lines that do not intersect with each other and a plurality of second lines that do not intersect with each other, the first lines and the second lines intersect with each other, an angle α formed by one of the first lines and a direction of the maximum diameter $W_b$ satisfies 45°≤α<90°, and an angle β formed by one of the second lines and the direction of the maximum diameter $W_b$ satisfies 45°≤β<90°.

It is preferable that the projected regions has a polygonal shape, a circular shape or an elliptic shape. It is further preferable that the polygonal shape has a rounded corner.

It is preferable that the columnar particles include at least one selected from the group consisting of silicon simple substance, a silicon alloy, a compound containing silicon and oxygen, and a compound containing silicon and nitrogen. In the case where the silicon alloy is an alloy of silicon and metallic element M, it is preferable that the metallic element M is an element incapable of forming an alloy with lithium. It is further preferable that the metallic element M is at least one selected from the group consisting of titanium, copper, and nickel.

It is preferable that the compound containing silicon and oxygen is represented by the following general formula (1):

$$SiO_x \qquad (1)$$

where 0<x<2.

It is preferable that the columnar particles are slanted with respect to a direction normal to the surface of the current collector.

It is preferable that the columnar particles include a layered body composed of a plurality of grain layers grown in a slanted manner with respect to the direction normal to the surface of the current collector. It is further preferable that the plurality of grain layers are grown in directions different from one another.

The present invention further relates to a lithium secondary battery comprising the foregoing negative electrode, a positive electrode including a positive electrode active material capable of absorbing and desorbing lithium ions, and an electrolyte with lithium ion conductivity.

Effect of the Invention

In the present invention, a current collector including a depression and a plurality of projected regions defined by the depression is used, and columnar particles are carried on the projected regions. As such, the columnar particles are hardly joined to each other, and therefore, the occurrence of wrinkles on the current collector or a cut in the current collector is suppressed. Thus, the present invention can improve the cycle characteristics of the lithium secondary battery.

In the case where the growth direction of the columnar particles is slanted with respect to the direction normal to the surface of the current collector, the area of the exposed portion of the negative electrode current collector opposing to the positive electrode active material layer is decreased, and therefore, the amount of lithium precipitated on the exposed portion of the negative electrode current collector can be reduced. For this reason, by allowing the growth direction of the columnar particles to be slanted with respect to the direction normal to the surface of the current collector, the charge-discharge efficiency can be improved.

BEST MODE FOR CARRYING OUT THE INVENTION

The invention is described below with reference to the drawings.

Figure 1:
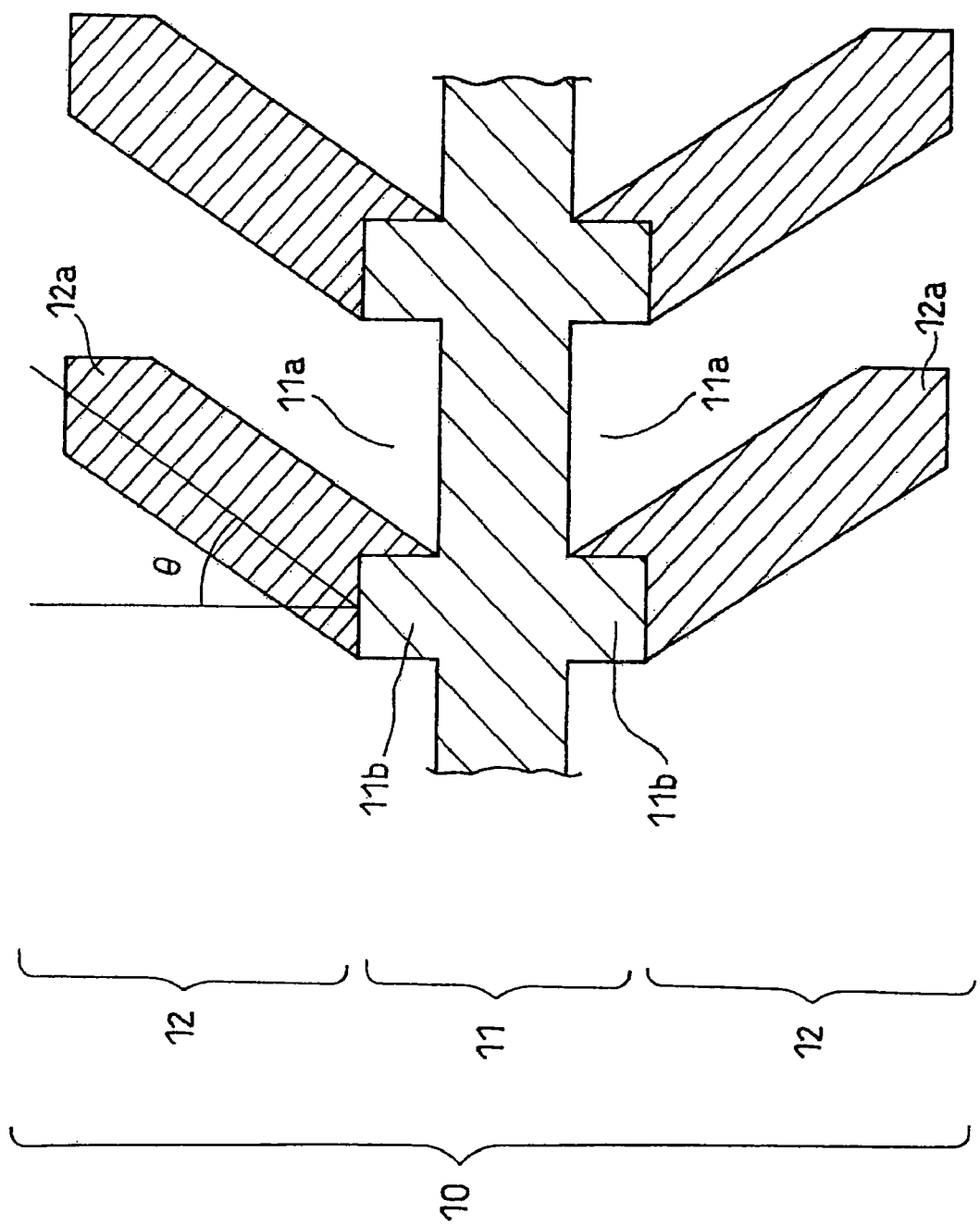
FIG. 1 A schematic longitudinal cross sectional diagram taken along the growth direction of the columnar particles of a negative electrode for a lithium secondary battery according to one embodiment of the present invention.

FIG. 1 shows a cross sectional diagram of a negative electrode 10 for a lithium secondary battery according to one embodiment of the present invention. The negative electrode 10 includes a current collector 11 and a negative electrode active material layer 12 carried on both faces of the current collector 11. The negative electrode active material layer 12 may be carried on only one face of the current collector 11.

The current collector 11 has a surface including a depression 11a and a plurality of projected regions 11b defined by the depression 11a. The negative electrode active material layer 12 includes a plurality of columnar particles 12a, and the columnar particles 12a are carried on the projected regions 11b. Here, each projected region may carry one columnar particle or two or more columnar particles.

The projected regions 11b are surrounded by the depression 11a, and the columnar particles are carried on the projected regions 11b. As such, the depression 11a provides a gap in the negative electrode active material layer 12. Therefore, the depression 11a has functions of preventing the columnar particles from being joined to each other during formation of an active material layer and of relieving the stress due to the expansion of the columnar particles during charge.

The shape of the cross section of the projected regions (or the shape viewed from the top) may be of a polygon exemplified by a square such as a regular square, a rectangle, a parallelogram and a rhombus, a regular pentagon, an irregular pentagon such as a home plate; a circle; an ellipse; and the like.

In the case where the shape of the cross section of the projected regions is of a polygon, it is preferable that the corners are rounded. If the corners of the projected regions are not rounded, the stress may be intensively applied to the corners of the projected regions when the columnar particles to be formed on the upper portion of the projected regions are expanded during charge. This causes the columnar particles to be readily separated from the projected regions and may results in a deterioration of the cycle characteristics.

In the foregoing current collector, a preferred ratio of an area of the projected regions relative to a total of the area of the projected regions and an area of the depression (an area ratio of the projected regions) is 10 to 30%. If the ratio is smaller than 10%, the columnar particles fail to be selectively formed only on the projected regions and are formed also on a place other than the projected regions. Because of this, a sufficient space is not provided between adjacent columnar particles, and the expansion of the columnar particles during charge may not be relieved. As a result, the current collector gets wrinkled or the current collector is cut, and therefore, the cycle characteristics of the lithium secondary battery may be deteriorated. If the ratio is greater than 30%, the space between adjacent columnar particles is reduced, and the expansion of the columnar particles during charge may not be relieved. As a result, the current collector gets wrinkled or the current collector is cut, and the cycle characteristics of the lithium secondary battery may be deteriorated.

The area of the projected regions and the area of the depression can be determined, for example, by measuring a 0.1 mm square region on the surface of the current collector with the use of the image thereof observed along the direction normal to the surface of the current collector under an electron microscope. The microscopic image can also be used to measure the distance between predetermined two points.

The observation of the current collector included in a lithium secondary battery can be performed in the following manner. The lithium secondary battery is disassembled in a charged state to take out a negative electrode plate. When the negative electrode plate is immersed in water, the lithium present in the negative electrode rapidly and vigorously reacts with water to cause the negative electrode active material to be readily separated from the current corrector. The current collector is washed with water and dried, and then observed under a microscope.

Figure 2:
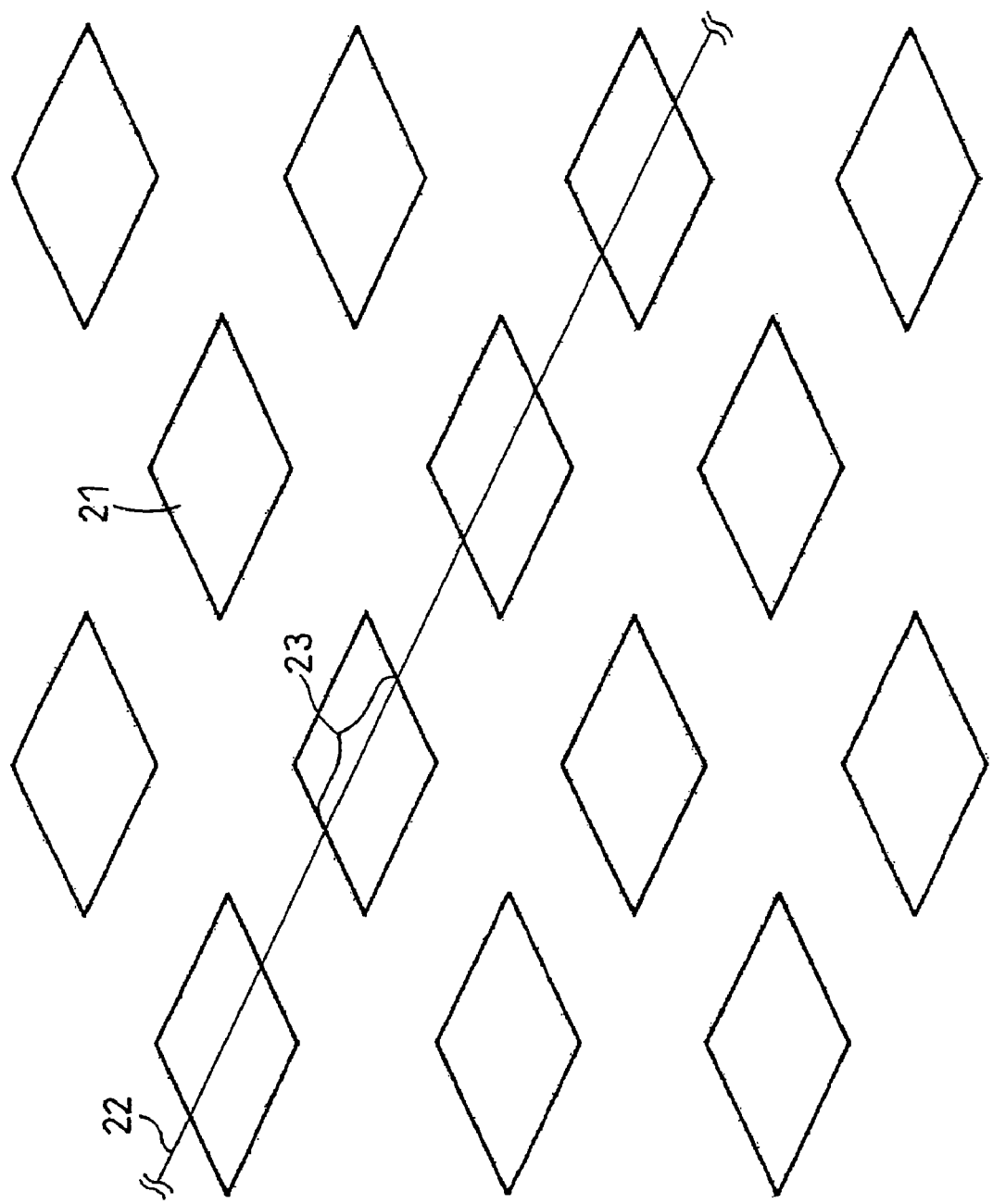
FIG. 2 A diagram explaining a line segment drawn in such manner that the ratio of a total length of portions overlapping with the projected regions is maximized, on a current collector included in a negative electrode for a lithium secondary battery according to another embodiment of the present invention.

As schematically shown in FIG. 2, on the surface of the current collector, it is possible to draw or assume a line segment 22 with a predetermined length such that the ratio of a total length of portions 23 overlapping with projected regions 21 is maximized. A ratio of the total length relative to a full length of the line segment 22 (a line segment ratio) is preferably 35 to 60% and more preferably 40 to 55%. It should be noted that FIG. 2 illustrates projected regions each having a cross section of a square shape.

If the total length is shorter than 35% of the length of the line segment, a sufficient space is not provided between columnar particles adjacent to each other along the line segment direction, and therefore one of the columnar particles in a charged state may collide with another columnar particle adjacent thereto in the line segment direction. As a result, the current collector gets wrinkled in the line segment direction or ruptured, and therefore, the cycle characteristics of the lithium secondary battery may be deteriorated. If the total length is longer than 60% of the length of the line segment, the columnar particles fail to be selectively formed only on the upper portion of the projected regions and are formed also on a place other than the projected regions. Because of this, a sufficient space is not provided between columnar particles adjacent to each other along the line segment direction, and therefore one of the columnar particles in a charged state may collide with another columnar particle adjacent thereto in the line segment direction. As a result, the current collector gets wrinkled along the line segment direction or ruptured, and therefore, the cycle characteristics of the lithium secondary battery may be deteriorated.

For example, an electron micrograph of the surface of the current collector having a size within a range from 0.05 mm square to 0.2 mm square is obtained, and a line segment is drawn such that the ratio of a total length of portions overlapping with the projected regions is maximized. It suffices if in the line segment the total length of the portions overlapping with the projected regions is 35 to 60% of a full length of the line segment.

Figure 3:
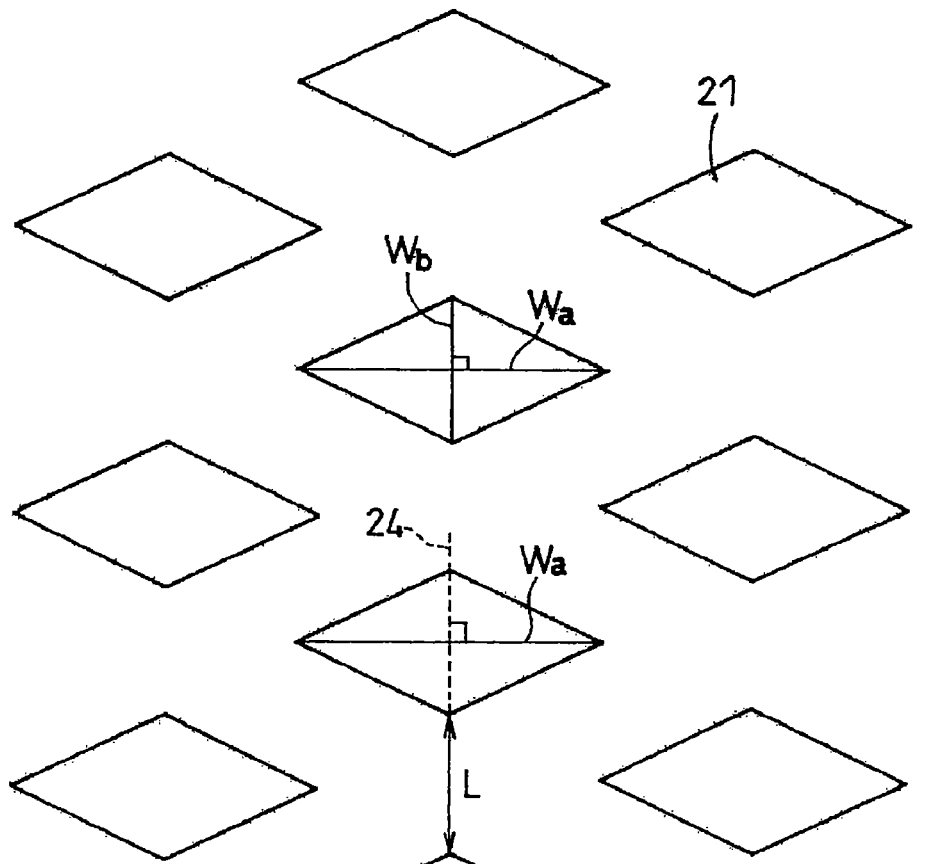
FIG. 3 Diagrams explaining: (a) a maximum diameter $W_a$ (in the second direction) of the projected regions, a maximum diameter $W_b$ in the first direction perpendicular to the second direction in which the maximum diameter $W_a$ lies, and a distance L between projected regions adjacent to each other along a direction perpendicular to the maximum diameter $W_a$ of the projected regions; and (b) a diagram explaining a height H of the projected regions, in a current collector included in a negative electrode for a lithium secondary battery according to yet another embodiment of the present invention.
Figure 3:
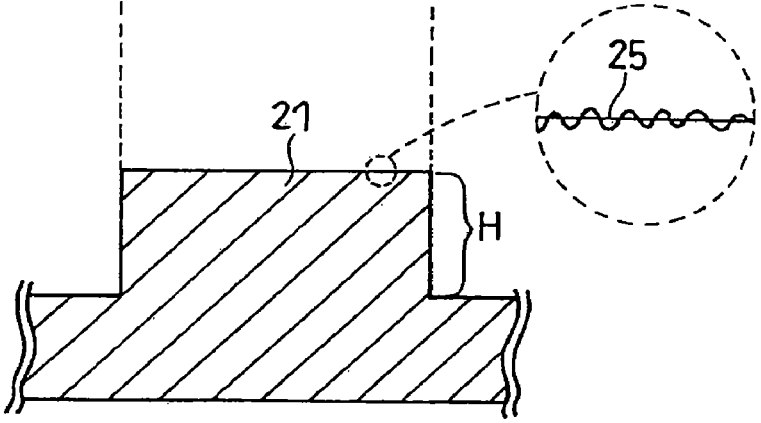

As is schematically shown in FIG. 3, a distance L between projected regions adjacent to each other along a direction 24 perpendicular to a maximum diameter $W_a$ of the projected regions 21, and a height H of the projected regions 21 preferably satisfy the following equation:

$$2 \leq (L/H) \leq 6.$$

More preferably, the ratio (L/H) is 2 to 4.4.

The maximum diameter $W_a$ of the projected regions 21 and a maximum diameter $W_b$ in the direction perpendicular to the maximum diameter $W_a$ preferably satisfy the following equation:

$$1 \leq (W_a/W_b) \leq -4.$$

More preferably, the ratio ($W_a/W_b$) is 1.5 to 3.

It should be noted that in FIG. 3, the shape of the cross section of the projected regions is of a square, but there is no particular limitation on the shape and the like of the cross section of the projected regions as long as the foregoing conditions are satisfied.

If the ratio (L/H) is smaller than 2, the columnar particles are formed only on the upper portion of the projected regions, leaving a vacant space around the lower portion of the projected regions, which may results in a lower energy density of the battery. If the ratio (L/H) is larger than 6, the columnar particles fail to be selectively formed only on the projected regions and are formed also on a place other than the projected regions. Because of this, a sufficient space is not provided between adjacent columnar particles, and the expansion of the columnar particles during charge may not be suppressed. As a result, the current collector gets wrinkled or the current collector is cut, and therefore, the cycle characteristics of the lithium secondary battery may be deteriorated.

The maximum diameter $W_a$ of the projected regions and the maximum diameter $W_b$ in the direction perpendicular to the maximum diameter $W_a$ can be determined from a projection plane of each projected region viewed from the above.

The maximum diameter $W_a$ of the projected regions can be determined, for example, by obtaining an electron micrograph of the top face of the current collector, measuring a maximum diameter of any 2 to 10 columnar particles, and averaging the obtained values. The maximum diameter $W_b$ in the direction perpendicular to the maximum diameter $W_a$ can be determined in the same manner as described above.

A preferred maximum diameter $W_a$ of the projected regions is 8 to 30 μm. A preferred maximum diameter $W_b$ in the direction perpendicular to the maximum diameter $W_a$ is 5 to 20 μm.

The height H of the projected regions, namely, the depth of the depression, means a distance between a reference plane 25 used in the measurement of the surface roughness (Ra) of the top face of the projected regions defined by the depression as shown in FIG. 3 and the deepest point in the depression. The depth of the depression can be determined, for example, by measuring a depth at any 2 to 10 points and averaging the obtained values.

The distance L between projected regions adjacent to each other means a shortest distance between two projected regions adjacent to each other along the direction perpendicular to the maximum diameter $W_a$ of the projected regions. The shortest distance is a distance measured at half height of each projected region.

It is possible to determine such a distance between two points, for example, by measuring the distance between the two points with respect to any 2 to 10 sets of points on an electron microscopic image of the cross section of the current collector, and averaging the obtained values.

The ratio of an area of the projected regions relative to a total of the area of the projected regions and an area of the depression (the area ratio of the projected regions) can be controlled, for example, by adjusting the distance L, the distance between projected regions adjacent to each other along the direction parallel to the maximum diameter $W_a$ of the projected regions 21, and the like. Alternatively, the area ratio of the projected regions can be controlled by adjusting the ratio (the line segment ratio) of a total length of the portions overlapping with the projected regions relative to a full length of a line segment drawn on the current collector such that a ratio of the total length of the portions overlapping with the projected regions is maximized.

The height H of the projected regions may be within a range of 1 to 30 μm, preferably within a range of 1 to 10 μm, and particularly preferably in a range of approximately 5 to 10 μm. A most preferred height of the projected regions is approximately 10 μm. The height H of the projected regions may be uniform or nonuniform. In other words, the projected regions may have different heights depending on where they are located. For example, it suffices if the average of the heights at 10 projected regions is 10 μm.

The depression preferably has a regular arrangement of depressed portions.

Among such arrangements, in the case where the current collector is a continuous length of sheet, it is preferable that the depression has a plurality of first depressed portions that do not intersect with each other and a plurality of second depressed portions that do not intersect with each other, and the first depressed portions and the second depressed portions intersect with each other. The plurality of first depressed portions may have a straight shape or a substantially straight shape or a curved shape. Further, the plurality of first depressed portions may be in parallel with each other or may be substantially in parallel with each other as long as they do not intersect with each other. This applies to the plurality of second depressed portions.

In other words, it is preferable that a plurality of projected regions are arranged regularly along a plurality of first lines that do not intersect with each other and a plurality of second lines that do not intersect with each other, and the first lines and the second lines intersect with each other. The plurality of first lines may have a straight shape or a substantially straight shape or a curved shape. Further, the plurality of first lines may be in parallel with each other or may be substantially in parallel with each other as long as they do not intersect with each other. This applies to the plurality of second lines.

It is further preferable that an angle α formed by one of the first lines and the direction of the maximum diameter $W_b$ satisfies 45°≦α<90°, and an angle β formed by one of the second lines and the direction of the maximum diameter $W_b$ satisfies 45°≦β<90°.

Figure 4:
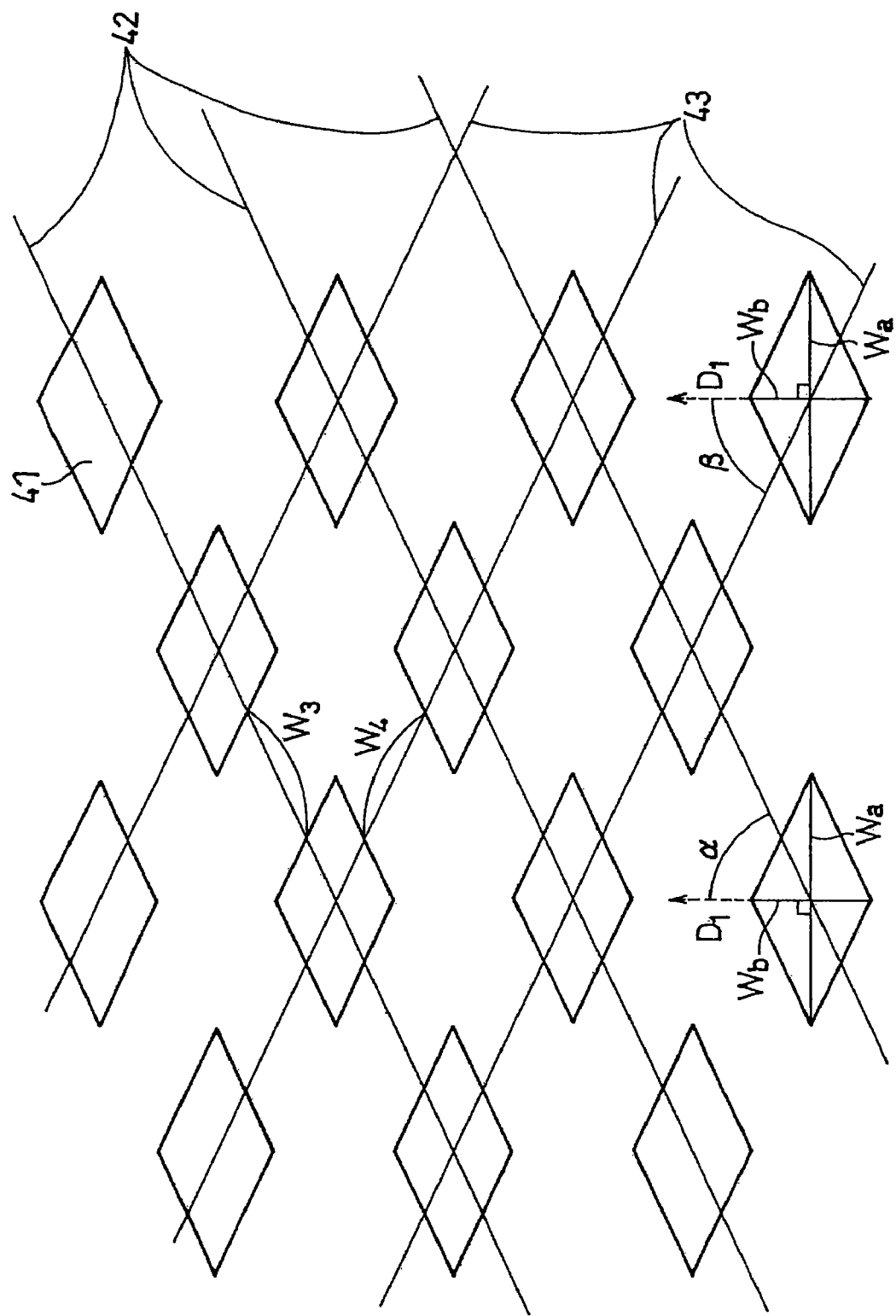
FIG. 4 One example of a pattern of the projected regions provided on the surface of a current collector.

FIG. 4 shows one example of a plurality of projected regions provided on the surface of the current collector in a regular pattern.

In FIG. 4, a plurality of projected regions 41 are arranged regularly along a plurality of first lines 42 and a plurality of second lines 43. The plurality of first lines 42 are in parallel with each other, and likewise the plurality of second lines 43 are in parallel with each other.

Here, in FIG. 4, the plurality of projected regions are arranged so that the centers thereof are positioned along the first lines and the second lines. Further, as shown in FIG. 4, in the case where the plurality of first lines 42 are in parallel with each other and the plurality of second lines 43 are in parallel with each other, the plurality of projected regions 41 are arranged in a lattice pattern.

The "center" corresponds to, for example, in a diamond, an ellipse or the like as shown in FIG. 4, a point of intersection of the maximum diameter $W_a$ and the maximum diameter $W_b$ of each projected region viewed along the direction normal thereto.

In FIG. 4, an arrow $D_1$ shows a direction parallel to the maximum diameter $W_b$ in the direction perpendicular to the maximum diameter $W_a$ of the projected regions 41. The arrow $D_1$ and one of the first lines 42 forms an angle α. The arrow $D_1$ and one of the second lines 43 forms an angle β.

As described above, it is preferable that the angle α and the angle β are each within a range of 45° or more and less than 90°. As the height of the columnar particles carried on the projected regions 41 (the thickness of the negative electrode active material layer) is increased, the columnar particles are readily joined to each other. However, the angle α and the angle β falling within the foregoing range can effectively prevent the columnar particles from being joined to each other. This is because the distances between columnar particles in the directions perpendicular and parallel to the arrow $D_1$ tend to be increased. In view of sufficiently preventing the columnar particles from being joined to each other, the angles α and β are each preferably within a range of 45° or more and less than 80°, and more preferably within a range of 50° or more and less than 75°.

If the angle α and the angle β are each less than 45°, the distances between columnar particles in the direction parallel to the arrow $D_1$ tend to become shorter. Moreover, the distances between columnar particles in the direction perpendicular to the arrow $D_1$ also tend be decreased because the columnar particles are expanded in the direction perpendicular to the arrow $D_1$ as the thickness of the columnar particles is increased.

If the angle α and the angle β are each 90°, the first lines 42 and the second lines 43 do not intersect with each other.

The direction of maximum diameter $W_a$ of the projected regions is preferably perpendicular to the longitudinal direction of the current collector. In other words, the direction of arrow $D_1$ is preferably parallel to the longitudinal direction of the current collector.

A distance $W_3$ between projected regions adjacent to each other along the first lines may be within a rage of 1 to 100 µm, and is preferably within a range of 5 to 50 µm. Likewise, a distance $W_4$ between projected regions adjacent to each other along the second lines may be within a range of 1 to 100 µm, and is preferably within a range of 5 to 50 µm. Most preferably, the distances $W_3$ and $W_4$ are approximately 15 to 25 µm.

Here, the distance $W_3$ between projected regions means a distance measured at half of the height of the projected regions, the distance being in parallel with a straight line passing through the centers of two projected regions adjacent to each other along one of the first lines. Likewise, the distance $W_4$ means a distance measured at half of the height of the projected regions, the distance being in parallel with a straight line passing through the centers of two projected regions adjacent to each other along one of the second lines. The distances $W_3$ and $W_4$ can be determined, for example, by measuring a distance between the projected regions at any two or ten sets of points, and averaging the obtained values.

In the case where the first lines have a curved shape, the angle α formed by the arrow $D_1$ and one of the first lines means an angle formed by the arrow $D_1$ and a tangent to the first line at the center of the projected region. Likewise, in the case where the second lines have a curved shape, the angle β formed by the arrow $D_1$ and one of the second lines means an angle formed by the arrow $D_1$ and a tangent to the second line at the center of the projected region. In the case where both the first lines and the second lines have a curved shape, when the angle α formed by the arrow $D_1$ and the tangent to the first line satisfies $45°\leq α<90°$, the angle β formed by the arrow $D_1$ and the tangent to the second line satisfies $45°\leq β<90°$, the effect as described above can be obtained.

Figure 5:
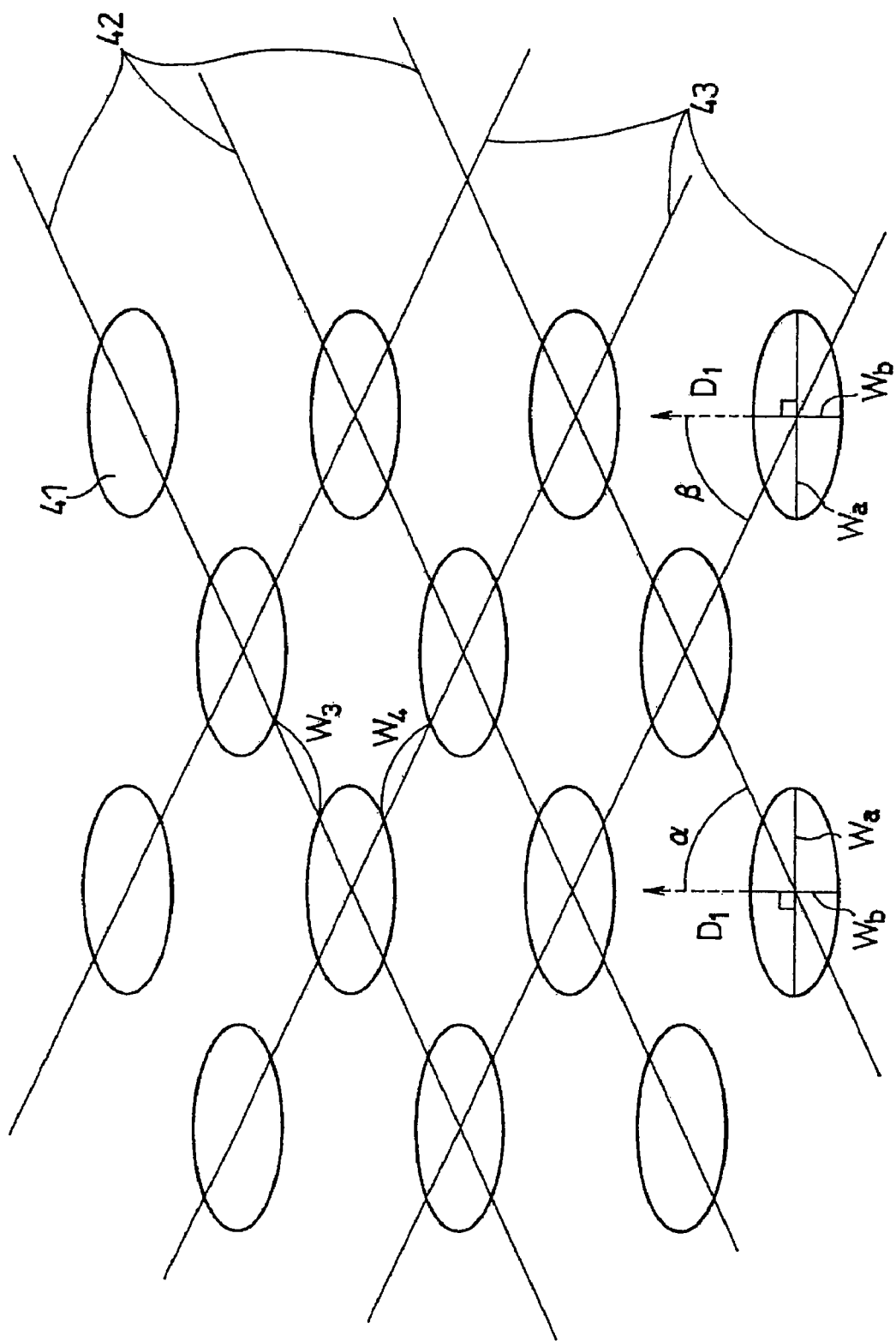
FIG. 5 Another example of a pattern of the projected regions provided on the surface of a current collector.
Figure 6:
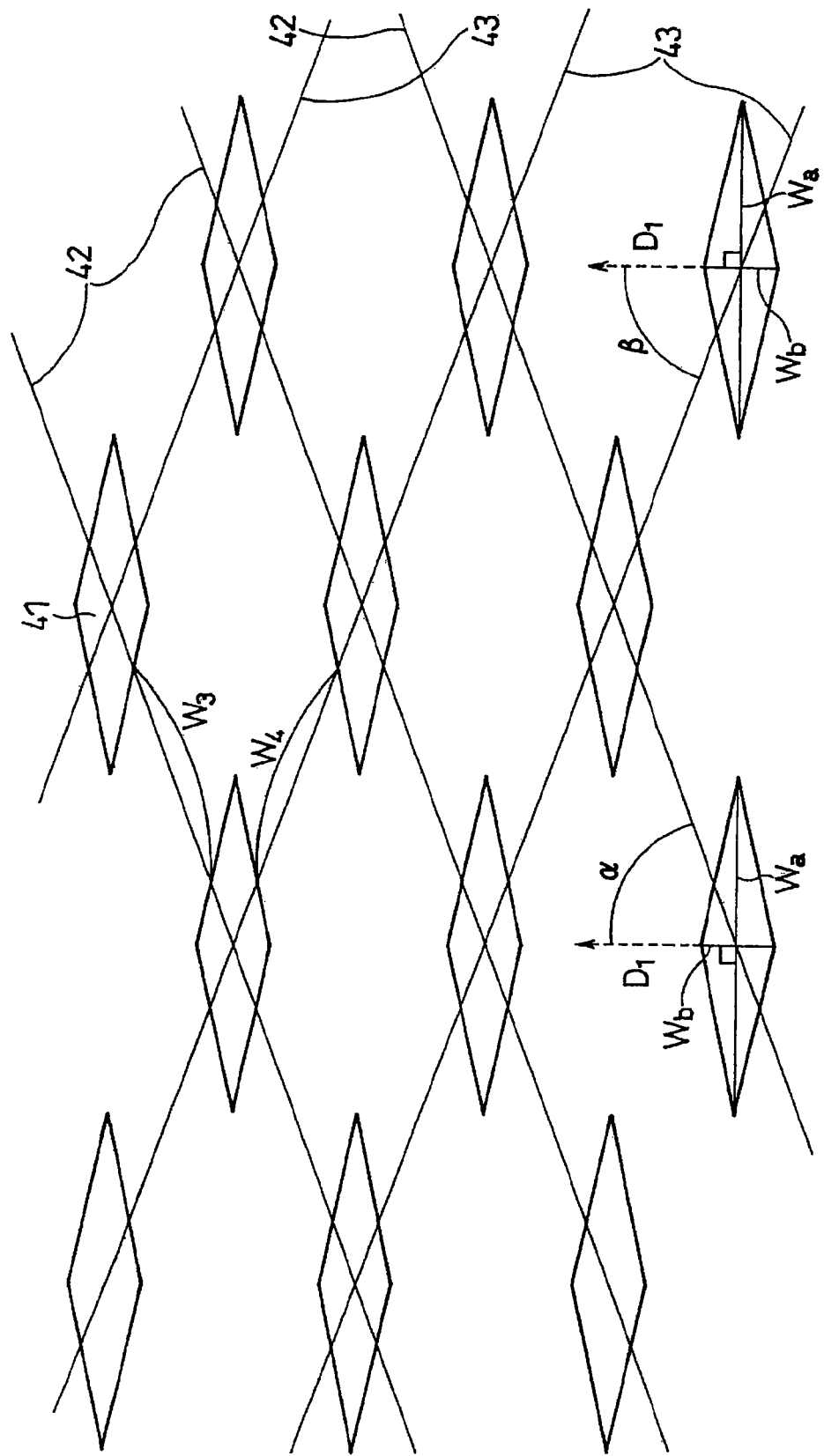
FIG. 6 Yet another example of a pattern of the projected regions provided on the surface of a current collector.

As another example, projected regions each having a cross section of an elliptic shape is shown in FIG. 5. Yet another example is shown in FIG. 6. In FIG. 6, unlike in FIG. 4, the each side of a square projected region is not in parallel with the first lines or the second lines.

In FIG. 5 and FIG. 6, the same component as that in FIG. 4 is denoted by the same reference number.

In the case of FIGS. 5 and 6, the height of the projected regions, the distance between projected regions adjacent to each other, the ratio of the foregoing distance to a width of the projected regions, and the like are preferably within the foregoing ranges. Further, the angle α formed by the arrow $D_1$ and one of the first lines and the angle β formed by the arrow $D_1$ and one of the second lines are preferably within the foregoing ranges.

The area ratio of the projected regions and the line segment ratio can be adjusted to be within a range of 10 to 30% and a range of 35 to 60%, respectively, by adjusting, for example, the distance L between projected regions adjacent to each other, and the like. In this case, it is preferable that the size of the projected regions is constant.

The current collector including a depression and a plurality of projected regions defined by the depression can be prepared by forming projected regions on a surface of a predetermined substrate by a plating method or a transfer method, so that the projected regions have a predetermined shape and a predetermined thickness. Alternatively, the current collector can be prepared, for example, by a cutting method, so that a predetermined pattern of depression is provided.

There is not particular limitation on the component material of the substrate. Examples of the material include copper, a copper alloy, and the like formed by a rolling method, an electrolytic method, and other methods. The thickness of the substrate is not particularly limited but generally 1 to 50 µm.

In the case where the current collector is prepared by forming projected regions on a substrate, it is possible to use, for example, Cu (copper), Ni (nickel), and Ti (titanium) as a material constituting the projected regions.

In the present invention, there may be projections and depressions on the top face of the projected regions. If so, the columnar particles tend to grow on the projections. There may be fine projections also on the side walls of the depression present around the projected regions. If so, a small amount of active material will be carried on the forgoing depression.

In the present invention, the depression present around the periphery of the projected regions and the depressions (fine depressions) present on the projected regions are distinguishable from each other by their shapes.

The projections and depressions present on the projected regions are composed of fine projections and fine depressions arranged in a disorderly or orderly manner. These projections and depressions are inevitably formed in the case where the current collector is made of an electrolytic copper foil or an electrolytic copper alloy foil. The projections and depressions may be formed artificially by, for example, a plating method, a transfer method, a cutting method, and the like.

On the other hand, the depression present around the projected regions have a straight shape or a curved shape and the length thereof is extremely longer than that of the fine depressions present on the projected regions. The depression present around the projected regions preferably has a predetermined pattern.

In the case where there are projections and depressions on the top face of the projected regions, the center-to-center distance between projections adjacent to each other is preferably 0.1 µm or more and 50 µm or less, and more preferably 1 µm or more and 20 µm or less.

The surface roughness Ra of the top face of the projected regions is desirably 0.1 to 30 µm, and more desirably 0.3 to 10 µm. For example, in the case where two or more columnar particles are formed on one projected region, if the surface roughness Ra is small, it may be difficult to provide a gap between columnar particles adjacent to each other. A larger surface roughness Ra provides a larger average thickness of the current collector.

The surface roughness Ra is specified in Japanese Industrial Standard (JIS B0601-1994) and can be measured, for example, with a surface roughness meter.

In addition, the values of the surface roughness Ra are preferably smaller than the values of the height of the projected regions.

In the case where the projected regions are formed by a transfer method using a roller with a predetermined pattern of holes formed thereon, and the like, the surface roughness of the substrate may be 0.1 to 30 μm.

The negative electrode active material layer includes columnar particles carried on the projected regions. In the present invention, the columnar particles preferably include silicon element.

The columnar particles preferably include, for example, at least one selected from the group consisting of silicon simple substance, a silicon alloy, a compound containing silicon and oxygen, and a compound containing silicon and nitrogen. For example, the negative electrode active material layer may be composed of only one selected from the foregoing materials. Alternatively, the active material layer may include particles of two or more selected from the foregoing materials. For example, the active material layer may include particles of silicon simple substance and particles of a silicon alloy.

The compound containing silicon and nitrogen may further contain oxygen. The active material layer composed of plural kinds of columnar particles is exemplified by an active material layer including plural kinds of columnar particles containing silicon, oxygen, and nitrogen in which the molar ratio of these elements is different from particle to particle. Further, the active material layer may include in one columnar particle thereof plural kinds of compounds including a silicon oxide in which the molar ratio of silicon to oxygen is different.

Metallic element M other than silicon contained in the silicon alloy is desirably a metallic element incapable of forming an alloy with lithium. It will suffice if metallic element M is a chemically-stable electron conductor, but desirably, it is at least one selected from the group consisting of titanium (Ti), copper (Cu) and nickel (Ni). One metallic element M may be contained in the silicon alloy alone or two or more metallic elements may be contained in the silicon alloy. The molar ratio of silicon to metallic element M in the silicon alloy is preferably within the following range.

When metallic element M is Ti, 0<Ti/Si<2 is preferred, and 0.1≦Ti/Si≦1.0 is particularly preferred.

When metallic element M is Cu, 0<Cu/Si<4 is preferred, and 0.1≦Cu/Si≦2.0 is particularly preferred.

When metallic element M is Ni, 0<Ni/Si<2 is preferred, and 0.1≦Ni/Si≦−1.0 is particularly preferred.

The compound containing silicon and oxygen preferably has a composition represented by the general formula (1):

$$SiO_x \qquad (1)$$

where 0≦x≦2. More preferably, the molar ratio x of oxygen to silicon is 0.01≦x≦1.

The compound containing silicon and nitrogen preferably has a composition represented by the general formula (2):

$$SiN_y \qquad (2)$$

where 0<y<4/3. More preferably, the molar ratio y of nitrogen to silicon is 0.01≦y≦1.

Each of the columnar particles may be a monocrystalline particle or a polycrystalline particle containing a plurality of crystallites. Alternatively, the columnar particle may be a particle containing fine crystals having a crystallite size of 100 nm or less or may be amorphous.

There is no particular limitation on the form of the columnar particle and the shape of the cross section thereof.

Figure 7:
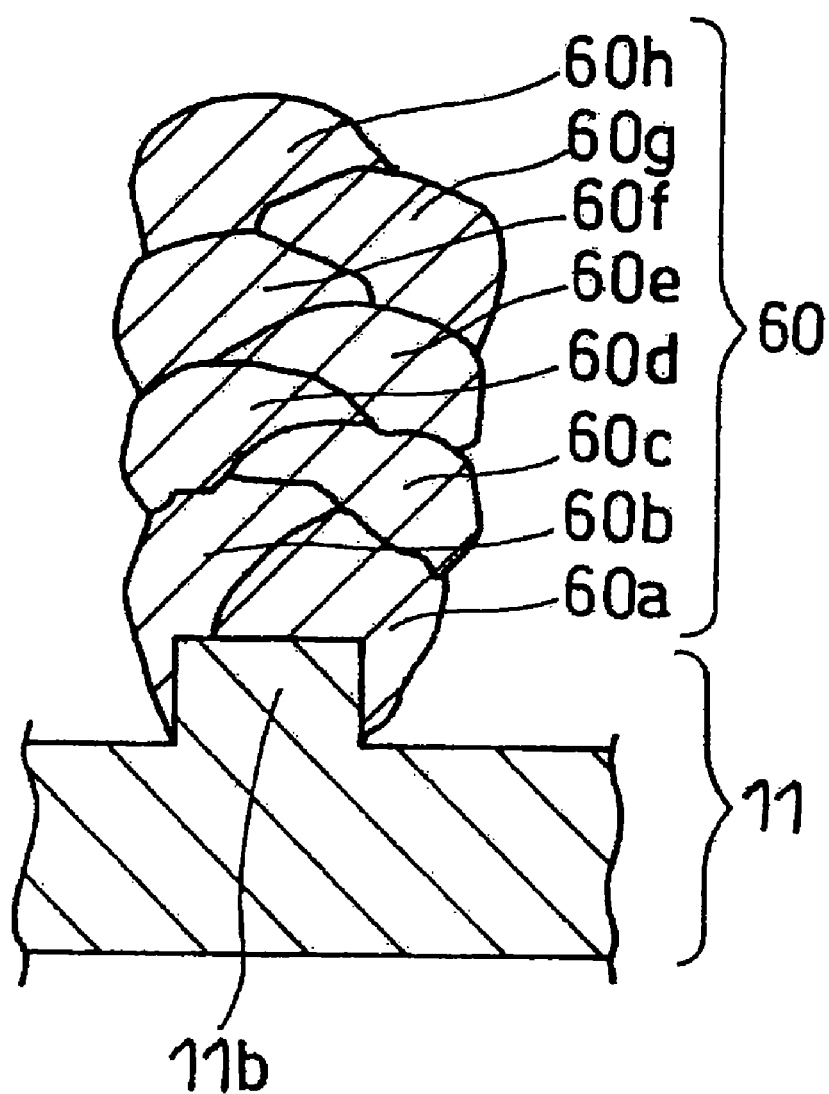
FIG. 7 A schematic diagram illustrating a columnar particle included in a negative electrode for a lithium secondary battery according to still another embodiment of the present invention.
Figure 8:
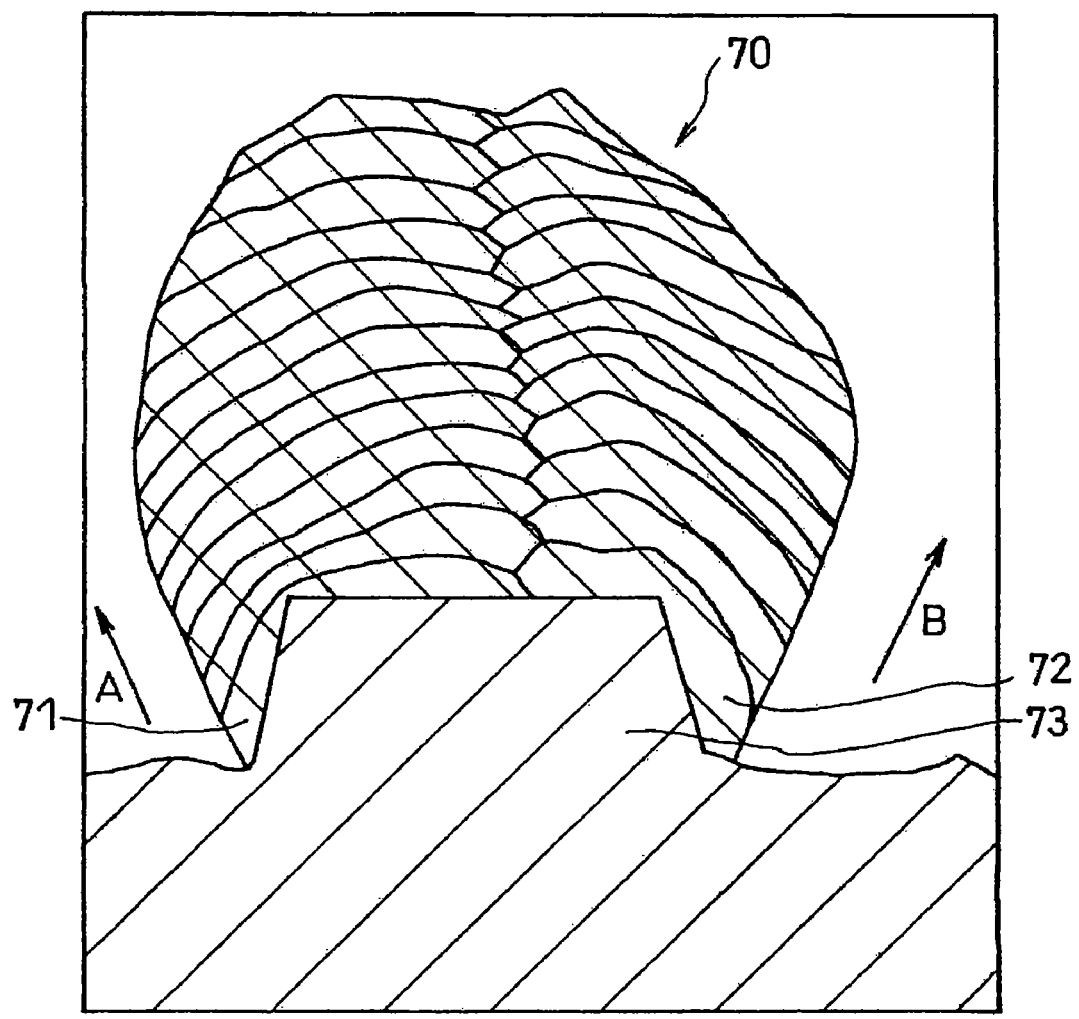
FIG. 8 A schematic diagram illustrating a columnar particle included in a negative electrode for a lithium secondary battery according to further yet another embodiment of the present invention.

The columnar particles carried on the projected regions may comprise a single particle as shown in FIG. 1, or alternatively may comprise a layered body composed of a plurality of grain layers as shown in FIGS. 7 and 8.

Further, the growth direction of the columnar particles may be slanted by an angle θ (hereinafter referred to as slanted angle θ) with respect to the direction normal to the surface of the current collector as shown in FIG. 1, or alternatively, may be parallel to the direction normal to the surface of the current collector as shown in FIGS. 7 and 8.

FIGS. 7 and 8 show a schematic diagram illustrating an active material columnar particle included in a negative electrode for a lithium ion secondary battery according to another embodiment of the present invention. In FIGS. 7 and 8, the same component as in FIG. 1 is denoted by the same reference number.

A columnar particle 60 in FIG. 7 has a layered body composed of eight grain layers 60a, 60b, 60c, 60d, 60e, 60f, 60g and 60h. In the case of the columnar particle in FIG. 7, the growth direction of each grain layer is slanted from the direction normal to the surface of the current collector, whereas the growth direction of the grain particle as a whole is parallel to the direction normal to the surface of the current collector. It should be noted that as long as the growth direction of the columnar particles as a whole is parallel to the direction normal to the surface of the current collector, the growth direction of each grain layer may be slanted in directions different from one another.

The columnar particle in FIG. 7 may be formed, for example, in the manner as described below. First, the grain layer 60a is formed so as to partially cover the top of the projected region 11b and the side face continuing from the top. Then, the grain layer 60b is formed so as to partially cover the remaining side face of the projected region 11b and the top surface of the grain layer 60a. In other words, in FIG. 7, the grain layer 60a is formed on one end portion of the projected region 11b including the top thereof, and the grain layer 60b is formed on the other end portion of the projected region 11b with partially overlapping the grain layer 60a. Further, the grain layer 60c is formed so as to partially cover the remaining top surface of the grain layer 60a and the top surface of the grain layer 60b. In other words, the grain layer 60c is formed so as to be mainly in contact with the grain layer 60a. Furthermore, the grain layer 60d is formed so as to be mainly in contact with the grain layer 60b. The grain layers 60e, 60f, 60g and 60h are formed so as to be layered alternately in the same manner, whereby the columnar particle as shown in FIG. 7 is formed.

A columnar particle 70 shown in FIG. 8 has a plurality of first grain layers 71 and a plurality of second grain layers 72.

The thickness of each grain layer in the columnar particle in FIG. 8 is smaller than the thickness of each grain layer in the columnar particle in FIG. 7. Moreover, the columnar particle in FIG. 8 has a smooth contour as compared with the columnar particle in FIG. 7.

Also, in the columnar particle in FIG. 8, as long as on average the growth direction of the columnar particles as a whole is parallel to the direction normal to the surface of the current collector, the growth direction of each grain layer may be slanted from the direction normal to the surface of the current collector. In the columnar particle in FIG. 8, the growth direction of the first grain layers 71 is a direction indicated by A and the growth direction of the second grain layers 72 is a direction indicated by B.

In the case where the growth direction of a columnar particle is slanted with respect to the direction normal to the surface of the current collector, the columnar particle may have one or more bends.

In the case of the columnar particles as shown in FIG. 1, the growth direction of each columnar particle projected on the surface of the current collector is preferably parallel to the direction of the maximum diameter $W_b$ of the projected regions. Further, in the case of the columnar particles in FIGS. 7 and 8, the growth direction of each grain layer projected on the surface of the current collector is preferably parallel to the direction of the maximum diameter $W_b$ of the projected regions.

A center-to-center distance between columnar particles adjacent to each other means a center-to-center distance between the centers of portions where these columnar particles are in contact with the current corrector (hereinafter referred to as a pitch). The pitch is dependent, for example, on the distance between the projected regions in the direction $W_a$ and/or the direction $W_b$, which is considered substantially equal to the distance between the projected regions.

The pitch is determined, for example, by measuring the center-to-center distance of any 2 to 10 sets of columnar particles adjacent to each other and averaging the obtained values.

The diameter of the columnar particles is dependent on the width of the projected regions. In view of preventing the crack on columnar particles or the separation of the columnar particles from the current collector due to the expansion during charge, the diameter of the columnar particles is preferably 100 µm or less, and particularly preferably 1 to 50 µm. The diameter of the columnar particles as used herein is a diameter in the direction perpendicular to the growth direction of the columnar particles determined at a center height of each columnar particle. The center height means a height at the midpoint between the highest position of the columnar particle in the direction normal to the current collector and the top face of the projected region being in contact with the columnar particle. The diameter of the columnar particles is determined, for example, by measuring the particle size in the direction perpendicular to the growth direction at the center height in any 2 to 10 columnar particles and averaging the obtained values.

It should be noted that in a columnar particle the particle sizes in the direction perpendicular to the growth direction may be the same or different along the growth direction of the columnar particles.

A plurality of columnar particles adjacent to each other may be united in the middle of growth. However, the individual columnar particle has a different starting point of growth. Accordingly, the columnar particles united in the middle of growth are isolated from each other around the surface of the current collector, and have different crystal growth conditions. It is possible therefore to determine the diameter of the individual columnar particle.

As described above, the ratio ($W_a/W_b$) is preferably 1 to 4. If the ratio ($W_a/W_b$) is greater than 4, a warpage amount of the columnar particles resulted from the expansion during charge is large in the direction of the maximum diameter $W_b$, causing a crack in the columnar particles or wrinkles on the current collector. This may results in a deterioration of the cycle characteristics of the lithium secondary battery.

The thickness of the negative electrode active material layer is preferably 0.1 µm or more and 100 µm or less, and particularly preferably 1 µm or more and 50 µm or less. When the thickness of the active material layer is 0.1 µm or more, a certain level of energy density can be ensured. When the thickness of the active material layer is 100 µm or less, it is possible to keep a ratio at which each columnar particle is shaded by other columnar particles low and keep the resistance to current collection from the columnar particles low. Therefore, this is advantageous in charge and discharge at a large current (high-rate charge-discharge).

The thickness of the negative electrode active material layer as used herein means a distance (height h) between the highest position of the columnar particles in the direction normal to the current collector and the top face of the projected regions being in contact with the columnar particles. The thickness of the negative electrode active material layer is determined, for example, by measuring the height h in any 2 to 10 columnar particles and averaging the obtained values.

It is desired that the thickness of the negative electrode active material layer and the diameter of the columnar particles be measured in a state in which the negative electrode active material contains lithium in an amount corresponding to an irreversible capacity but does not contain lithium in an amount corresponding to a reversible capacity (i.e., a state in which the reversible capacity is zero). The state in which the reversible capacity is zero corresponds to a state in which the volume of the negative electrode active material layer in a finished battery is minimal. When lithium is absorbed in the columnar particles during charge, the columnar particles expand, resulting in an increase in the volume of the negative electrode active material layer.

In view of sufficiently ensuring the contact area between the electrolyte and the columnar particles and sufficiently relieving the stress due to the expansion of the columnar particles, the porosity P of the negative electrode active material layer is desirably 10% to 70%, and more desirably 30% to 60%. A porosity P of the negative electrode active material layer of 10% or more is considered enough to relieve the stress due to expansion and contraction of the columnar particles. This can ensure a sufficient amount of electrolyte to be in contact with the columnar particles. A porosity P exceeding 70% will reduce the energy density of the negative electrode. It should be noted that if the negative electrode active material layer has a porosity P greater than 70%, it can be suitably used for a negative electrode depending on the application of the battery.

The porosity P of the active material layer can be measured, for example, by a method using a mercury porosimeter or a method calculating from the weight and thickness in a specific area of the active material layer and the density of the active material.

For a negative electrode sample used for measuring the porosity, it is preferable to use a sample obtained by only cutting a portion of the current collector on which the active material layer is evenly (uniformly) carried. In doing this, a portion of the current collector with the active material layer carried on both faces thereof may be used, or alternatively as the sample, a portion of the current collector with the active material layer carried on one face thereof may be used as the sample.

In the measurement using a mercury porosimeter, assuming that the volume of mercury intruded in the pores of the sample is VH and the absolute volume of the active material layer (the total absolute volume of the columnar particles included in the active material layer) is VT, the porosity P (%) is determined by the formula: $100 \{VH/(VT+VH)\}$. Here, when the current collector portion being the sample has a rough surface, the volume of mercury intruded in the rough portion of the current collector portion must be included in VH to measure the porosity.

The measurement of the porosity P using a mercury porosimeter is preferably performed in a state in which the active material layer does not contain lithium at all. A porosity P' of the active material layer in a state in which the reversible capacity is zero can be determined by correcting the porosity P. When the absolute volume of the active material layer in a state in which the reversible capacity is zero is Va and the volume of the active material layer that does not contain lithium at all is V0, the porosity P and the porosity P' satisfy the equation:

$$P'=100-Va(100-P)/V0.$$

The porosities P or P' can also be calculated from the weight and thickness in a specific area of the active material layer and the density of the active material. When the thickness in a specific area S in a sample is T, the weight of the active material layer in the specific area is W, and the density of the active material is D, the porosity P (%) is determined by the formula: $100 [\{ST-(W/D)\}/ST]$.

In the case where the growth direction of the columnar particles is slanted with respect to the direction normal to the surface of the current collector and the active material layer is carried on both faces of the current collector, the slanted direction of the columnar particles carried on one face of the current collector and the slanted direction of the columnar particles carried on the other face of the current collector may be different from or identical to each other. For example, in FIG. 1, the slanted direction of the columnar particles carried on one face of the current collector and the slanted direction of the columnar particles carried on the other face of the current collector are identical to each other. In other words, the slanted direction of the columnar particles carried on one face of the current collector and the slanted direction of the columnar particles carried on the other face of the current collector are line-symmetric with respect to the current collector serving as an axis of symmetry. Further, for example, the slanted direction of the columnar particles carried on one face of the current collector and the slanted direction of the columnar particles carried on the other face of the current collector may be opposite to each other. Furthermore, the slanted angle of the columnar particles carried on one face of the current collector and the slanted angle of the columnar particles carried on the other face of the current collector may be identical to or different from each other.

The slanted angle θ may vary as the height of the columnar particles is increased. FIG. 1 shows a case in which the slanted angle θ of the columnar particles is constant irrespective of the height.

In the case where the columnar particles are slanted, the slanted angle θ of the columnar particles is desirably 10° or more and less than 90°, and more desirably 10° or more and 80° or less. If the slanted angle θ is close to 90°, it is difficult to allow the columnar particles to be carried on the current collector. Moreover, in predetermined columnar particles, a portion shaded by other columnar particles becomes larger. This may deteriorate the high-rate characteristics of the battery. If the angle θ is less than 10°, the area of the exposed portion of the negative electrode current collector opposite to the positive electrode active material layer is increased, resulting in a reduction in the charge-discharge efficiency of the battery.

The slanted angle θ can be determined, for example, by measuring an angle formed by a growth direction of the Columnar particles and the direction normal to the surface of the current collector with respect to any 2 to 10 columnar particles and averaging the obtained values.

In the case where the growth direction of the columnar particles is slanted with respect to the direction normal to the surface of the current collector, for example, the area of the exposed portion of the negative electrode current collector opposite to the positive electrode active material layer is decreased and a possibility that lithium may be precipitated on the exposed portion of the negative electrode current collector is reduced. For this reason, by allowing the columnar particles to be carried on the projected regions defined by the depression on the current collector and allowing the growth direction of the columnar particles to be slanted from the direction normal to the surface of the current collector, improved charge-discharge efficiency and improved charge-discharge characteristics can be provided. In particular, a sharp deterioration of the cycle characteristics as observed during charge and discharge at a large current can be remarkably suppressed.

In the case where a continuous length of sheet current collector is used as shown in FIG. 4, 5 or 6, the growth direction of the columnar particles projected on the surface of the current collector is preferably parallel to the longitudinal direction of the current collector, namely, a direction indicated by allow $D_1$, and more preferably coincides with the direction indicated by arrow $D_1$. This can, for example, remarkably suppress the joining of the columnar particles to each other.

Figure 9:
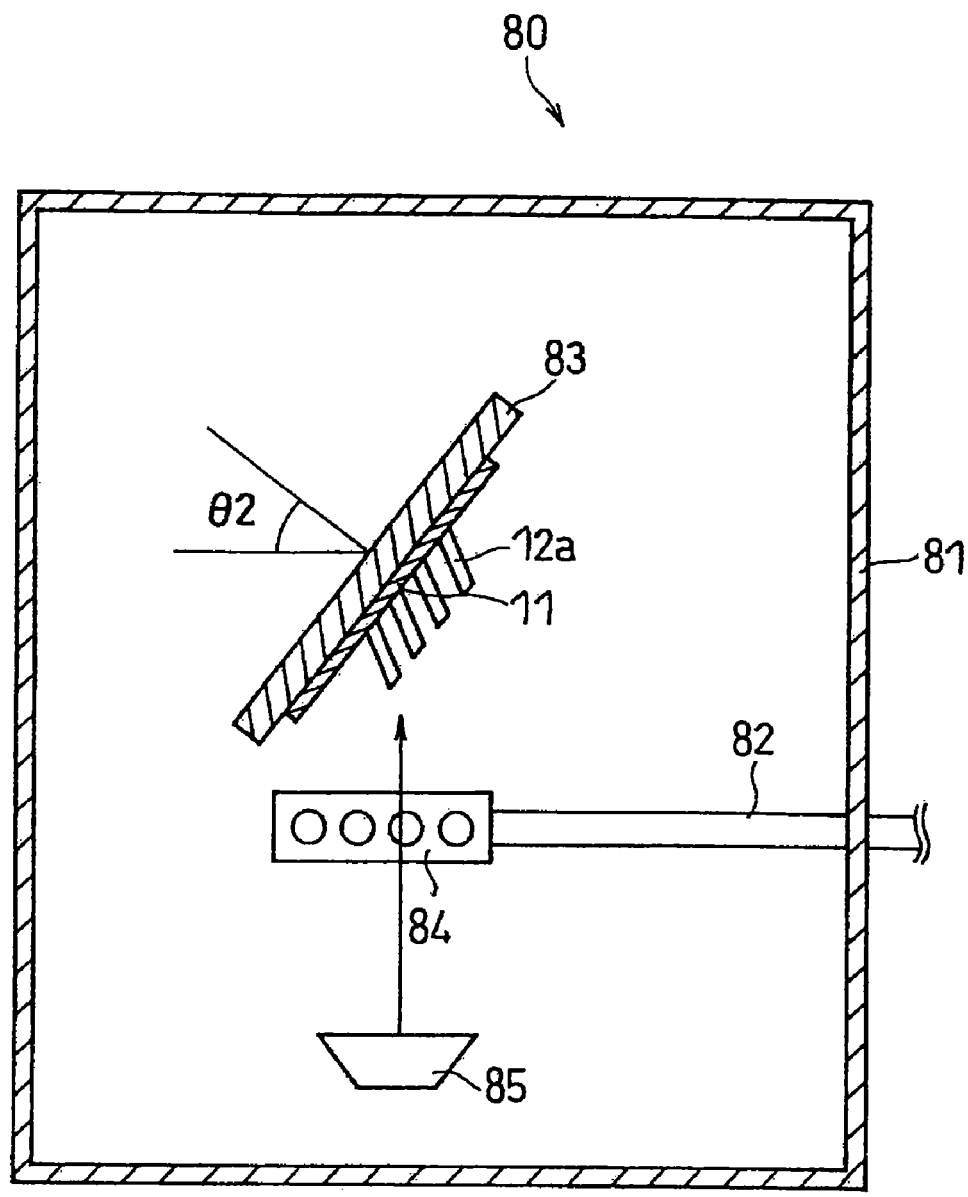
FIG. 9 A schematic diagram of an example of a vapor deposition apparatus used for formation of a negative electrode active material layer.

The negative electrode active material layer as shown in FIG. 1 is formed, for example, using a vapor deposition apparatus 80 as shown in FIG. 9. FIG. 9 is a side view schematically illustrating the configuration of the vapor deposition apparatus 80.

The vapor deposition apparatus 80 is provided with a chamber 81 for realizing vacuum atmosphere, electron beams (not shown) serving as a heating means, a gas introduction pipe 82 for introducing gas into the chamber 81, and a fixing table 83 for fixing a current collector 86. The gas introduction pipe 82 is provided with a nozzle 84 for discharging gas. The fixing table 83 for fixing a current collector is disposed above the nozzle 84. Vertically below the fixing table 83, a target 85 to be deposited on the surface of the current collector to form columnar particles is disposed.

For example, in the case of growing columnar particles composed of a silicon oxide on the surface of the current collector, silicon simple substance is used as the target 85, and highly purified oxygen gas is ejected from the nozzle 84. The target 85 is irradiated with electron beams, so that the target is heated and evaporated. The evaporated silicon is passed through oxygen atmosphere and deposited on the surface of the current collector as a silicon oxide. The columnar particles 12a composed of a silicon oxide are thus formed on the projected regions of the current collector 11.

In the vapor deposition apparatus 80, it is possible to change the positional relation between the current collector and the target 85 by adjusting the angle of the fixing table 83. In other words, the slanted angle θ of the columnar particles can be controlled by adjusting the angle θ2 formed by the direction normal to the surface of the current collector and the horizontal direction.

Figure 10:
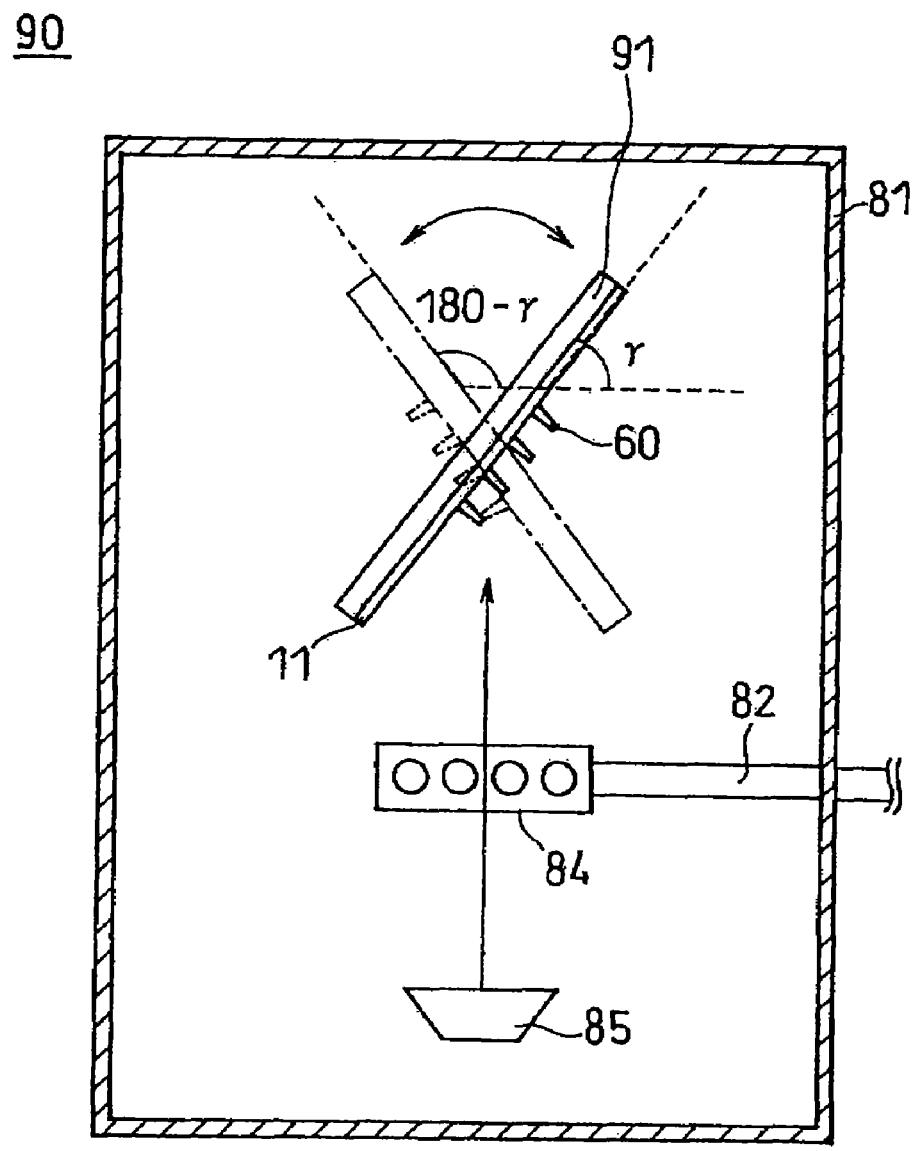
FIG. 10 A schematic diagram of another example of a vapor deposition apparatus used for formation of a negative electrode active material layer.

The negative electrode active material layer including columnar particles as shown in FIG. 7 is formed, for example, using a vapor deposition apparatus 90 as shown in FIG. 10. FIG. 10 is a side view schematically illustrating the configuration of the vapor deposition apparatus 90. In FIG. 10, the same component as that in FIG. 9 is denoted by the same reference number and the description thereof is omitted.

A fixing table 91 being a plate-like member is supported in the chamber 81 in an angularly adjustable manner or in a rotatable manner. On one face of the fixing table in the thickness direction thereof, the negative electrode current collector 11 is fixed. The angle of fixing table 91 is adjusted between a position indicated by the solid line and a position indicated by the dash-dotted line in FIG. 10. The position indicated by the solid line is a position where the face of the fixing table 91 on which the negative electrode current collector 11 is fixed faces the target 85 disposed vertically therebelow, and the angle formed by the fixing table 91 and a line in the horizontal direction is $\gamma°$ (position A). The position indicated by the dash-dotted line is a position where the face of the fixing table 91 on which the negative electrode current collector 11 is fixed faces the target 85 disposed vertically therebelow, and the angle formed by the fixing table 91 and a line in the horizontal direction is $(180-\gamma)°$ (position B). The angle $\gamma°$ can be selected as needed according to the dimensions of a negative electrode active material layer to be formed.

In the formation method of a negative electrode active material layer using the vapor deposition apparatus 90, first, the negative electrode current collector 11 is fixed on the fixing table 91, and an oxygen gas is introduced in the interior of the chamber 81. Under this condition, the target 85 is irradiated with electron beams to be heated, so that the vapor thereof is generated. For example, silicon is used as the target, the evaporated silicon is passed through oxygen atmosphere and deposited on the surface of the current collector as a silicon oxide. At this time, by disposing the fixing table 91 at the position indicated by the solid line, the grain layer 60*a* as shown in FIG. 7 is formed on the projected regions. Next, by performing angular adjustment of the fixing table 91 to the position indicated by the dash-dotted line, the grain layer 60*b* as shown in FIG. 7 is formed. The columnar particle 60 having eight grain layers as shown in FIG. 7 is formed by alternately adjusting the angle of the position of the fixing table 91.

The columnar particle as shown in FIG. 8 is basically formed using the vapor deposition apparatus of FIG. 10. The columnar particle of FIG. 8 is formed, for example, by setting the vapor deposition time at the position A and the position B to be shorter and the number of grain layers to be layered to be greater than in the case of the columnar particle of FIG. 7.

Figure 11:
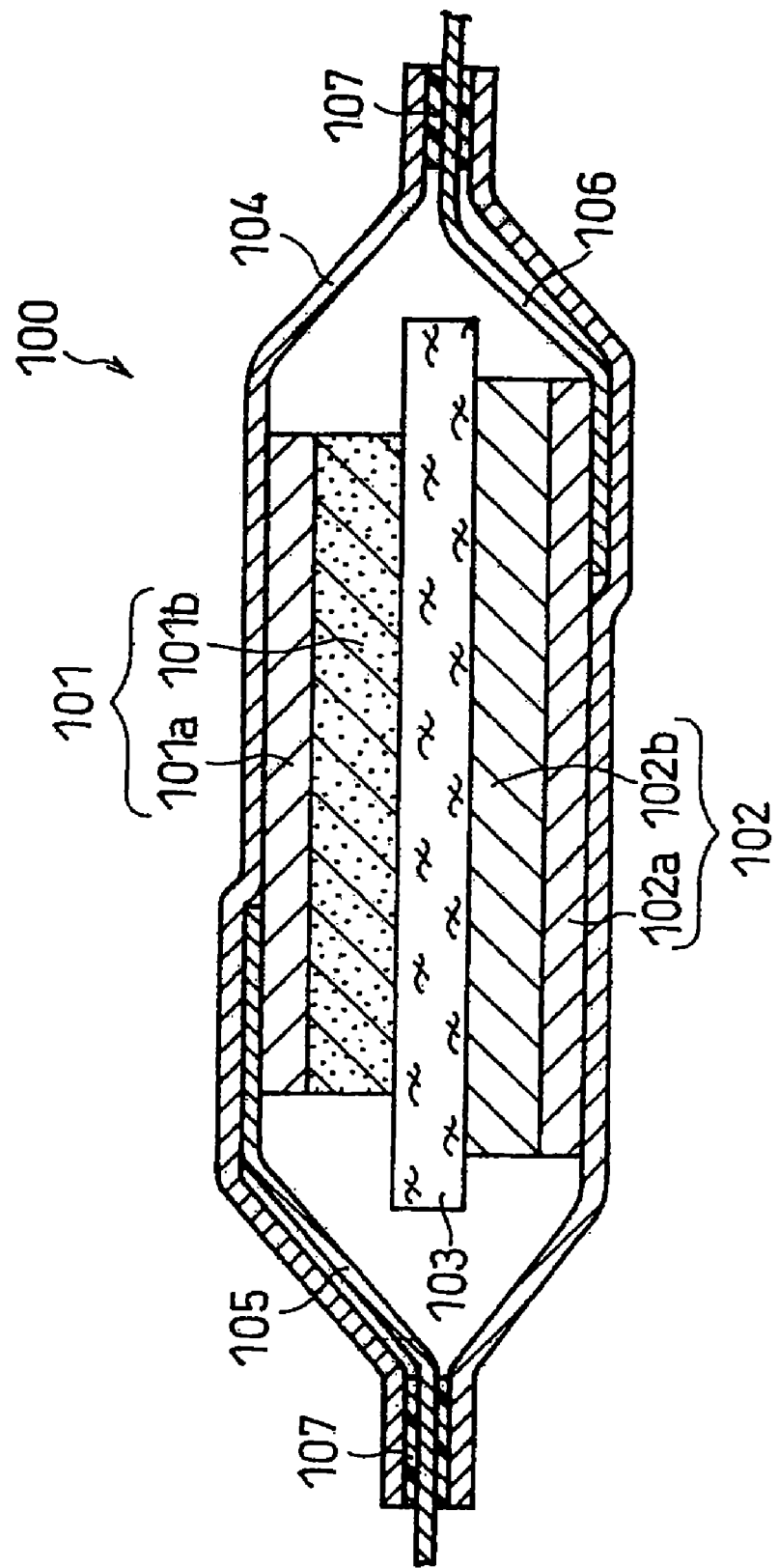
FIG. 11 A vertical cross sectional diagram of a lithium secondary battery according to one embodiment of the present invention.

The negative electrode as described above is used as a negative electrode for a lithium ion secondary battery. FIG. 11 shows a lithium ion secondary battery according to one embodiment of the present invention.

A battery 100 of FIG. 11 includes a layered-type electrode plate assembly and an electrolyte with lithium ion conductivity (not shown) housed in a battery case 104. The electrode plate assembly includes a positive electrode 101, a negative electrode 102, and a separator 103 interposed between the positive electrode 101 and the negative electrode 102. The separator 103 is impregnated with the electrolyte.

The negative electrode 102 includes a negative electrode current collector 102*a* and a negative electrode active material layer 102*b* as described above. Specifically, the negative electrode active material layer 102*b* includes columnar negative electrode active material particles carried on the projected regions of the current collector. In the battery of FIG. 11, the negative electrode active material layer is provided on only one face of the negative electrode current collector.

The positive electrode 101 includes a positive electrode current collector 101*a* and a positive electrode active material layer 101*b* carried on one face thereof.

To the face of the negative electrode current collector 102*a* on which the negative electrode active material layer is not formed, one end of a negative electrode lead 106 is connected; and to the face of the positive electrode current collector 101*a* on which the positive electrode active material layer is not formed, one end of a positive electrode lead 105 is connected.

The battery case 104 has openings at positions opposite to each other. From one opening of the battery case 104, the other end of the positive electrode lead 105 is extended; and from the other opening of the battery case 104, the other end of the negative electrode lead 106 is extended. The openings of the battery case 104 are hermetically sealed with a resin material 107.

The positive electrode active material layer 101*b* desorbs lithium during charge and absorbs lithium during discharge. The negative electrode active material layer 102*b* absorbs lithium during charge and desorbs lithium during discharge.

In FIG. 11, one example a layered-type lithium secondary battery is shown, but the negative electrode for a lithium secondary battery of the present invention is applicable to a cylindrical battery or a prismatic battery having a spiral type (a wound type) electrode plate assembly.

It should be noted that in the layered-type battery, the electrodes may be layered such that the total number of layers of the positive electrode and the negative electrode is three or more. In this case, a positive electrode having a positive electrode active material layer formed on both faces or one face of its current collector and a negative electrode having a negative electrode active material layer formed on both faces or one face of its current collector are used and arranged such that all of the positive electrode active material layers are opposed to the negative electrode active material layer and all of the negative electrode active material layers are opposed to the positive electrode active material layer.

The slanted condition of the columnar particles may be the same in all of the negative electrode active material layers or may be different from one negative electrode active material layer to another. For example, the columnar particles may not be slanted with respect to the direction normal to the surface of the current collector or may be slanted in all of the negative electrode active material layers. Further, in the negative electrode having a negative electrode active material layer formed on both faces of the current collector, the slanted condition of the columnar particles formed on one face of the current collector may be identical to or different from the slanted condition of the columnar particles on the other face of its current collector. Furthermore, the slanted condition of the columnar particles at one place may be different from the slanted condition thereof at another place in the same negative electrode.

In the lithium secondary battery of the present invention, there is no limitation on the components other than the negative electrode.

For the positive electrode active material, any known material in the art may be used. Examples of such a material include a lithium-containing transition metal oxide such as lithium cobaltate ($LiCoO_2$), lithium nickelate ($LiNiO_2$), and lithium manganate ($LiMn_2O_4$).

The positive electrode active material layer may be composed of a positive electrode active material only or of a material mixture including a positive electrode active material, a binder, and a conducive agent. The positive electrode active material layer may be composed of a plurality of columnar particles as in the case of the negative electrode active material layer.

For a material constituting the positive electrode current collector, any know material in the art may be used. Examples of such a material include Al, an Al alloy, Ni, Ti, and the like.

Examples of the lithium-ion conductive electrolyte include various lithium-ion conductive solid electrolytes and non-aqueous electrolytes known in the art. For example, the non-aqueous electrolyte includes a non-aqueous solvent and a lithium salt dissolved in the non-aqueous solvent. In the present invention also, any non-aqueous solvent and lithium salt as conventionally used in the art may be used. Further, there is no particular limitation on the composition of the non-aqueous electrolyte.

For materials constituting the separator and the battery case, various forms of materials as conventionally used for a lithium secondary battery may be used.

It should be noted that in the present invention, a solid electrolyte with lithium ion conductivity may be used or a gelled electrolyte including the foregoing electrolyte may be used in place of the separator.

The present invention is specifically described below referring to Examples of the present invention, but the present invention is not limited to the following Examples.

EXAMPLES

Example 1

A layered-type lithium secondary battery as shown in FIG. 11 was fabricated.

(i) Preparation of Positive Electrode

A positive electrode material mixture paste was prepared by sufficiently mixing 10 g of lithium cobaltate ($LiCoO_2$) powder having a mean particle size of 10 μm serving as the positive electrode active material, 0.3 g of acetylene black serving as the conductive agent, 0.8 g of polyvinylidene fluoride powder serving as the binder, and an appropriate amount of N-methyl-2-pyrrolidone (NMP).

The prepared paste was applied on one face of a 20-μm-thick positive electrode current collector made of an aluminum foil, dried and then rolled to form a positive electrode active material layer. Thereafter, the positive electrode sheet thus obtained was cut into a predetermined shape to give a positive electrode. The thickness of the positive electrode active material layer carried on one face of the current collector was 70 μm, and the size thereof was 14.5 mm×14.5 mm. To the face of the positive electrode current collector on which the positive electrode active material layer was not formed, a positive electrode lead made of aluminum was connected.

(ii) Preparation of Negative Electrode

First, on one face of a 18-μm-thick rolled copper foil (available from Nippon Foil Mfg. Co., Ltd.) cut in a size of 80 mm×15 mm, a plurality of projected regions defined by a depressed portion were formed in a pattern as shown in FIG. 4 with a plating method in the manner as described below. The surface roughness of the rolled copper foil was 1 μm, and the center-to-center distance between projected regions adjacent to each other was 1 μm.

A negative photoresist was applied first on the rolled copper foil (available from Nippon Foil Mfg. Co., Ltd.). The resist film on the copper foil was exposed to light with the use of a negative mask with rhombus patterns each having a size of 10 μm×30 μm in diagonal arranged thereon, whereby the patterns were developed. On the grooves thus formed, copper particles were precipitated by an electrolysis method. Thereafter, the resist was removed to give a current collector having projected regions (rhombi each having a size of 10 μm ($W_a$)× 30 μm ($W_b$)) defined by a depressed portion.

The height H of the projected regions formed on one face of the rolled copper foil was 8 μm. The distance $W_3$ between projected regions adjacent to each other along one of the first lines was 16 μm, and the distance $W_4$ between projected regions adjacent to each other along one of the second lines was 16 μm.

The distance L between projected regions adjacent to each other along the direction perpendicular to the maximum diameter $W_a$ of the projected regions was 12 μm.

The angle α formed by an axis $D_1$ parallel to the longitudinal direction of the current collector and one of the first lines was 70°. The angle β formed by the axis $D_1$ and one of the second lines was 70°.

Subsequently, a negative electrode active material layer as shown in FIG. 1 was formed on the current collector using a vapor deposition apparatus (available from ULVAC, Inc.) provided with an electron beam heating means (now shown) as shown in FIG. 9. The negative electrode active material layer was formed by vapor-depositing an active material along a direction slanted only by a predetermined angle with respect to the direction normal to the surface of the current collector (oblique vapor deposition).

The gas introduction pipe provided for the vapor deposition apparatus was connected to a bomb filled with oxygen gas through a mass flow controller. From the nozzle of the gas introduction pipe, an oxygen gas having a purity of 99.7% (available from Nippon Sanso Corporation) was ejected at a flow rate of 80 sccm.

Above the nozzle, a fixing table for fixing a negative electrode current collector was disposed. The angle θ2 formed by the fixing table and the horizontal plane was set at 60°. On the fixing table, the negative electrode current collector prepared in the manner as described above was fixed. Here, the negative electrode current collector was fixed on the fixing table such that the growth direction of the columnar particles to be formed on the current collector projected on the surface of the current collector became in parallel with the longitudinal direction of the current collector.

Vertically below the fixing table, a target to be deposited on the surface of the current collector was disposed. For the target, silicon simple substance having a purity of 99.9999% (available from Kojundo Chemical Laboratory Co., Ltd.) was used.

The accelerating voltage of electron beams irradiated to the target of silicon simple substance was set at −8 kV, and the emission of electron beams was set at 500 mA. The vapor of silicon simple substance was passed through oxygen atmosphere and then deposited on the negative electrode current collector fixed on the fixing table. The vapor deposition time was set at 30 minutes, that is, the negative electrode active material was deposited on the negative electrode current collector for a duration of 30 minutes, thereby to give a negative electrode sheet including a negative electrode active material layer composed of columnar particles including a compound containing silicon and oxygen (a silicon oxide) provided on the negative electrode current collector. In the obtained negative electrode sheet, the active material layer was formed only on one face of the current collector. Here, the length of the growth direction of the columnar particles thus formed projected on the surface of the current collector (i.e., the length of the columnar particles in the longitudinal direction of the current collector) was 20 μm. The length of the growth direction of the columnar particles in the direction normal to the surface of the current collector was 20 μm. The direction of the growth direction of the columnar particles projected on the surface of the current collector was perpendicular to the direction of the maximum diameter $W_a$ of the projected regions.

Thereafter, on the surface of the negative electrode, a 10-μm-thick Li metal film was vapor-deposited by a vacuum vapor deposition method.

The obtained negative electrode sheet was cut in a size of 15 mm×15 mm to give a negative electrode 1A. To the face of the negative electrode 1A on which the negative electrode active material layer was not formed, a negative electrode lead made of nickel was connected.

The content of oxygen in the formed negative electrode active material layer was quantitated by a combustion method to determine a composition of the formed silicon oxide. As the result, the composition of the silicon oxide was $SiO_{0.5}$.

Next, the surface and cross section of the negative electrode 1A was observed under an electron microscope.

The result of the surface observation showed that the joining of the columnar particles was suppressed, and the angle θ formed by the growth direction of the columnar particles and the direction normal to the current collector was 45°. The thickness of the negative electrode active material layer was 20 μm, and the pitch between columnar particles adjacent to each other was 9 μm. The diameter of the columnar particles at the center height was 5 μm.

Subsequently, the porosity P of the active material layer of the negative electrode 1A was measured with a mercury porosimeter (Autopore III 9410 available from Shimadzu Corporation) in the following manner.

First, the rolled copper foil as used in the negative electrode 1A (surface roughness: 1 μm, and thickness: 35 μm) was cut in a size of 15 mm×15 mm, and provided with a depression and a plurality of projected regions on the surface thereof by the plating method as described above to yield a current collector. On one face of the obtained current collector, columnar particles having a composition of $SiO_{0.5}$ were formed under the same conditions as described above, whereby a sample was prepared.

From the weight of the sample thus prepared, the weight of the current collector was subtracted to determine the weight of the active material layer. From the weight of the active material layer and the density of $SiO_{0.5}$ (2.29 g/cm$^3$), the total volume (VT) of active material particles included in the active material layer was determined. Here, in the foregoing calculation, the average of the true density of Si (2.33 g/cm$^3$) and the true density of SiO (2.24 g/cm$^3$) was used as the density of $SiO_{0.5}$.

Next, mercury was allowed to intrude into the pores of the sample of the active material layer to determine the volume (VH) of the mercury intruded. From the true volume (VT) of the active material layer and the volume (VH) of the mercury intruded into the pores of the active material layer, the porosity P (=100 {VH/(VT+VH)}) was determined. As the result, the porosity of the active material layer was 34%.

The properties of the negative electrode 1A are shown below.

(Negative Electrode Current Collector)
  Thickness of substrate (rolled copper foil): 18 μm
  Surface roughness of substrate: 1 μm
  Center-to-center distance between projected regions adjacent to each other in substrate: 1 μm
  Shape of cross section of projected regions: Rhombus
  $W_a$ of projected regions: 30 μm
  $W_b$ of projected regions: 10 μm
  Height H of projected regions: 8 μm
  Distance L between projected regions: 12 μm
  Distance $W_3$ between projected regions: 16 μm
  Distance $W_4$ between projected regions: 16 μm
  Angle α formed by axis $D_1$ parallel to longitudinal direction of current collector and one of first lines: 70°
  Angle β formed by axis $D_1$ parallel to longitudinal direction of current collector and one of second lines: 70°
  Area ratio of projected regions: 25%
  Line segment ratio: 50%
  Ratio (L/H): 1.5
  Ratio ($W_a/W_b$): 3

(Negative Electrode Active Material Layer)
  Composition: $SiO_{0.5}$
  Size: 15 mm×15 mm
  Angle θ formed by growth direction of columnar particles and direction normal to surface of current collector: 45°
  Thickness: 20 μm
  Diameter of columnar particles at center height: 5 μm
  Porosity P: 34%
  Length of columnar particles in growth direction: 30 μm
  Length of columnar particles in direction normal to surface of current collector (i.e., thickness t of active material layer): 20 μm
  Length of columnar particles in longitudinal direction of current collector: 20 μm (iii) Fabrication of Battery Between the positive electrode and the negative electrode prepared in the manner as described above, a separator was disposed to give a layered-type electrode plate assembly. In the obtained electrode plate assembly, the positive electrode and the negative electrode were arranged such that the positive electrode active material layer and the negative electrode active material layer were opposed to each other with the separator interposed therebetween. As the separator, a 20-μm-thick polyethylene microporous film (available from Asahi Kasei Corporation) was used.

The electrode plate assembly thus obtained was inserted into a battery case made of aluminum laminate sheet together with an electrolyte. The electrolyte was prepared by dissolving $LiPF_6$ at a concentration of 1.0 mol/L in a mixed solvent in which ethylene carbonate (EC) and ethyl methyl carbonate (EMC) were mixed in a volume ratio of 1:1.

These were allowed to stand for a predetermined period of time to impregnate the positive electrode active material layer, the negative electrode active material layer and the separator with the electrolyte. Thereafter, the positive electrode lead and the negative electrode lead were extended to the exterior of the battery case from the openings located opposite to each other. In this state, the pressure in the interior of the battery was reduced, and the both openings of the battery case were hermetically sealed with a resin material, whereby a battery was finished. The obtained battery was referred to as a battery 1A.

Comparative Example 1

A comparative negative electrode 1B was prepared in the same manner as in Example 1 except that an electrolytic copper foil (available from Furukawa Circuit Foil Co., Ltd., surface roughness: 2 μm, and thickness: 18 μm) was used as the negative electrode current collector. In the comparative negative electrode 1B, a depression was not formed on the current collector. In other words, the current collector of the comparative negative electrode 1B had no depression and no projected regions.

Subsequently, the comparative negative electrode 1B was cut to observe its cross section under an electron microscope. Further, the porosity P of the active material layer of the comparative negative electrode 1B was determined using a mercury porosimeter in the same manner as described above.

The properties of the negative electrode 1B are shown below.

(Negative Electrode Current Collector (Electrolytic Copper Foil))

Thickness: 18 μm

Surface roughness: 2 μm

Center-to-center distance between projections adjacent to each other: 9 μm (Negative Electrode Active Material Layer)

Composition: $SiO_{0.5}$

Size: 15 mm×15 mm

Angle θ formed by growth direction of columnar particles and direction normal to surface of current collector: 45°

Thickness t: 20 μm

Center-to-center distance between columnar particles adjacent to each other: 9 μm Diameter of columnar particles at center height: 5 μm Porosity P: 31%

A comparative battery 1B was fabricated in the same manner as in Example 1 except that the comparative negative electrode 1B was used.

[Evaluation Method]

(i) Charge-Discharge Characteristics

The battery 1A and comparative battery 1B were each housed in a thermostatic chamber at 20° C. and subjected to charge in a constant-current and constant-voltage system as follows. First, each battery was charged at a constant current of 1 C rate (1 C is a value of current at which the whole battery capacity can be consumed in one hour) until the battery voltage reached 4.2 V. After the battery voltage reached 4.2 V, each battery was charged at a constant voltage until the current value reached 0.05 C.

The batteries after charge were allowed to stand for 20 minutes, and then discharged at a high-rate constant current of 1 C until the battery voltage reached 2.5 V. After the high-rate discharge, each battery was further re-discharged at a constant current of 0.2 C until the battery voltage reached 2.5 V. After the re-discharge, the batteries were allowed to stand for 20 minutes.

Figure 12:
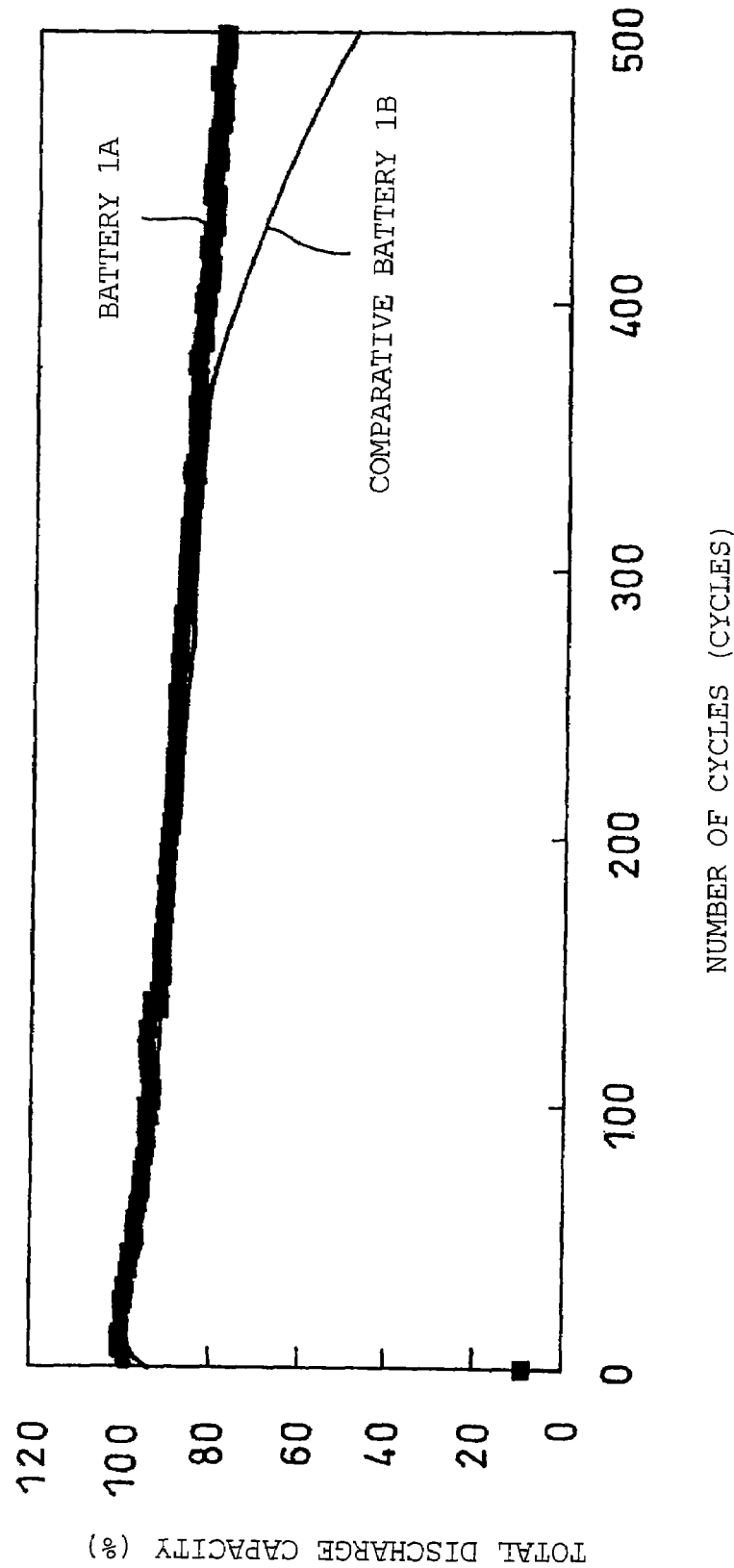
FIG. 12 A graph showing the relationship between the number of charge-discharge cycles and the total discharge capacity in a battery 1A and a comparative battery 1B.

The foregoing cycle of charge and discharge was repeated 500 cycles in total. FIG. 12 shows the relationship between the number of cycles and a total discharge capacity (a total discharge capacity in the high-rate discharge capacity and the re-discharge capacity). In FIG. 12, the total discharge capacity (%) on the vertical axis is based on a total discharge capacity at the 10th cycle.

The ratio of a total discharge capacity relative to a charge capacity at the 10th cycle was determined as a percentage. Likewise, the ratio of a total discharge capacity relative to a charge capacity at the 500th cycle was determined as a percentage. The values thus determined are shown in Table 1 as a charge-discharge efficiency.

Further, the ratio of a discharge capacity in the high-rate discharge relative to the total discharge capacity at the 10th cycle was determined as a percentage. Likewise, the ratio of a discharge capacity in the high-rate discharge relative to the total discharge capacity at the 500th cycle was determined as a percentage. The values thus determined are shown in Table 1 as a high-rate ratio.

Furthermore, assuming that the total discharge capacity at the 10th cycle was 100, the ratio of the total discharge capacity at the 500th cycle relative to the total discharge capacity at the 10th cycle was determined as a percentage. The values thus determined are shown in Table 1 as a capacity retention rate.

TABLE 1

|  | Number of cycles (cycles) | Charge-discharge efficiency (%) | High-rate ratio (%) | Capacity retention rate (%) |
|---|---|---|---|---|
| Battery 1A | 10 | 99.8 | 93 | 100 |
|  | 500 | 99.8 | 87 | 80 |
| Comparative battery 1B | 10 | 99.8 | 93 | 100 |
|  | 500 | 99.2 | 83 | 48 |

As shown in Table 1 and FIG. 12, in the battery 1A, the charge-discharge efficiency, the high-rate ratio, and the capacity retention rate were high in the early cycles such as at the 10th cycle as well as after passage of 500 cycles.

On the other hand, the capacity retention rate at the 500th cycle of the comparative battery 1B was remarkably lower than that of the battery 1A. This was presumably because the wrinkles on the current collector and a cut in the current collector due to the expansion during charge occurred in the comparative battery 1B.

As described above, it was confirmed that the use of the negative electrode of the present invention can effectively improve the cycle characteristics. It should be noted that in this example, a current collector provided with a depression and projected regions arranged in a pattern as shown in FIG. 4 was used. When a current collector including a depression and a plurality of projected regions arranged in a pattern other than that of FIG. 4 is used, for example, when the angle α and the angle β are an angle of other than 45°, the same effect as described above can be provided.

Example 2

Next, an experiment was performed with varied sizes of projected regions to determine an appropriate range of the size of projected regions. Negative electrodes 2A to 2D were prepared in the same manner as in Example 1 except that the pattern of the projected regions provided on the current collector was changed as follows and the negative electrode active material layer was changed as follows. Batteries 2A to 2D were fabricated in the same manner as in Example 1 except that the negative electrodes 2A to 2D were used.

(i) Negative Electrode 2A

The projected regions were formed such that the shape of the cross section of each projected region was a rhombus in which $W_a$ was 8 μm and $W_b$ was 10 μm, the distance L between projected regions adjacent to each other along the direction perpendicular to the maximum diameter $W_a$ was 18 μm, and the height H of the projected regions was 6 μm. A negative electrode current collector 2A was prepared in the same manner as in Example 1 except these.

Here, in the negative electrodes 2B to 2D, the maximum diameter $W_a$ of the projected regions was perpendicular to the direction of the growth direction of the columnar particles projected on the surface of the current collector, and the maximum diameter $W_b$ of the projected regions was parallel to the direction of the growth direction of the columnar particles projected on the surface of the current collector. In the negative electrode 2A, for convenience, the maximum diameter of the projected regions in the direction perpendicular to the direction of the growth direction of the columnar particles projected on the surface of the current collector was regarded as $W_a$, and the maximum diameter of the projected regions in the direction parallel to the direction of the growth direction of the columnar particles projected on the surface of the current collector was regarded as $W_b$.

Next, a negative electrode active material layer including a plurality of columnar particles as shown in FIG. 7 was formed on the current collector 2A by way of oblique vapor deposition using a vapor deposition apparatus as shown in FIG. 10.

The obtained negative electrode current collector 2A was set on the fixing table 91. The fixing table 91 was slanted so as to form an angle α of 60° with respect to the horizontal plane. The accelerating voltage of electron beams irradiated to the target 85 of silicon simple substance was set at −8 kV, and the emission of electron beams was set at 500 mA. The oxygen gas flow rate was set at 80 sccm. In this state, vapor deposition was performed for a duration of 3 minutes and 45 seconds, thereby to form a first grain layer.

Next, a second grain layer was formed on the first grain layer under the same conditions as described above except that the fixing table 91 was slanted so as to form an angle (180−α) of 120° with respect to the horizontal plane. Thereafter the angle of the fixing table was changed alternately between 60° and 120° to repeat the foregoing operation, whereby a negative electrode active material layer including columnar particles each composed of a layered body as shown in FIG. 7 in which eight grain layers were formed.

The negative electrode 2A was prepared in the same manner as in Example 1 except that the negative electrode active material layer was formed in the manner as described above. The thickness t of the active material layer (the height of the layered body) was 20 μm The content of oxygen in the formed negative electrode active material layer was quantitated by a combustion method to determine a composition of the negative electrode active material including a compound containing silicon and oxygen. As the result, the composition of the negative electrode active material was $SiO_{0.5}$.

(ii) Negative Electrode 2B

A negative electrode current collector 2B was prepared in the same manner as in Example 1 except that the projected regions were formed such that the shape of the cross section of each projected region was a rhombus in which $W_a$ was 10 μm and $W_b$ was 10 μm, the distance L between projected regions was 18 μm, and the height H of the projected regions was 6 μm.

The negative electrode active material layer was formed on the prepared negative electrode current collector 2B in the same manner as in the negative electrode 2A, whereby the negative electrode 2B was prepared.

(iii) Negative Electrode 2C

A negative electrode current collector 2C was prepared in the same manner as in Example 1 except that the projected regions were formed such that the shape of the cross section of each projected region was a rhombus in which $W_a$ was 40 μm and $W_b$ was 10 μm, the distance L between projected regions was 18 μm, and the height H of the projected regions was 6 μm.

The negative electrode active material layer was formed on the prepared negative electrode current collector 2C in the same manner as in the negative electrode 2A, whereby the negative electrode 2C was prepared.

(iv) Negative Electrode 2D

A negative electrode current collector 2D was prepared in the same manner as in Example 1 except that the projected regions were formed such that the shape of the cross section of each projected region was a rhombus in which $W_a$ was 45 μm and $W_b$ was 10 μm, the distance L between projected regions was 18 μm, and the height H of the projected regions was 6 μm.

The negative electrode active material layer was formed on the prepared negative electrode current collector 2D in the same manner as in the negative electrode 2A, whereby the negative electrode 2D was prepared.

The properties of the current collectors 2A to 2D used for the negative electrodes 2A to 2D are shown in Table 2, and the properties of the active material layers in the negative electrodes 2A to 2D are shown in Table 3.

TABLE 2

| | Current collector 2A | Current collector 2B | Current collector 2C | Current collector 2D |
|---|---|---|---|---|
| $W_a$ of projected regions | 8 μm | 10 μm | 40 μm | 45 μm |
| $W_b$ of projected regions | 10 μm | 10 μm | 10 μm | 10 μm |
| Distance L between projected regions | 18 μm | 18 μm | 18 μm | 18 μm |
| Height H of projected regions | 6 μm | 6 μm | 6 μm | 6 μm |
| Distance $W_3$ between projected regions | 13 μm | 14 μm | 34 μm | 37 μm |
| Distance $W_4$ between projected regions | 13 μm | 14 μm | 34 μm | 37 μm |
| Angle α formed by $D_1$ and first line | 39° | 45° | 76° | 77° |
| Angle β formed by $D_2$ and second line | 39° | 45° | 76° | 77° |
| Area ratio of projected regions | 17.9% | 17.9% | 17.9% | 17.9% |
| Line segment ratio | 41.7% | 41.7% | 41.7% | 41.7% |
| Ratio (L/H) | 3 | 3 | 3 | 3 |
| Ratio ($W_a/W_b$) | 0.8 | 1 | 4 | 4.5 |

TABLE 3

| | Negative electrode 2A | Negative electrode 2B | Negative electrode 2C | Negative electrode 2D |
|---|---|---|---|---|
| Composition of negative electrode active material | $SiO_{0.5}$ | $SiO_{0.5}$ | $SiO_{0.5}$ | $SiO_{0.5}$ |
| Thickness t of negative electrode active material layer | 20 μm | 20 μm | 20 μm | 20 μm |
| Size of negative electrode active material layer | 15 mm × 15 mm | 15 mm × 15 mm | 15 mm × 15 mm | 15 mm × 15 mm |
| Angle θ formed by growth direction of columnar particles and direction normal to surface of current collector | 0° | 0° | 0° | 0° |
| Porosity P of negative electrode active material layer | 32% | 34% | 45% | 45% |

The capacity retention rate after passage of 500 cycles of the batteries 2A to 2D was measured in the same manner as in Example 1. The results are shown in Table 4.

TABLE 4

| | Battery 2A | Battery 2B | Battery 2C | Battery 2D |
|---|---|---|---|---|
| Capacity retention rate | 65% | 75% | 73% | 62% |

From the results of the batteries 2A to 2D, it was found that with a ratio ($W_a/W_b$) between the diagonals $W_a$ and $W_b$ of the rhombus of 1 to 4, favorable cycle characteristics were obtained.

In contrast, with a ratio ($W_a/W_b$) of smaller than 1 or greater than 4, the cycle characteristics were slightly reduced.

When the ratio ($W_a/W_b$) was smaller than 1, the porosity of the active material was low, and adjacent active material particles collided with each other during the expansion of the active material, causing a part of the active material to be separated from the current collector. Presumably, because of this, the cycle characteristics were slightly reduced. When the ratio ($W_a/W_b$) was greater than 4, the diameter of the active material particles in the direction parallel to $W_a$ was great, and the current corrector was severely warped in the direction parallel to $W_a$ during the expansion of the active material particles. This presumably caused the active material to be cracked or separated from the current collector, and as a result, the cycle characteristics were slightly reduced.

Example 3

Next, an experiment was performed to determine an appropriate range of the area ratio and the line segment ratio of the projected regions.

The area ratio and the line segment ratio of the projected regions were adjusted by varying the distance L between projected regions adjacent to each other along the direction perpendicular to the maximum diameter $W_a$.

Negative electrodes 3A to 3D were prepared in the same manner as in Example 1 except that the rhombic pattern of the projected regions provided on the current collector was changed as follows. Batteries 3A to 3D were fabricated in the same manner as in Example 1 except that the negative electrodes 3A to 3D were used.

(i) Negative Electrode 3A

A negative electrode current collector 3A was prepared in the same manner as in Example 1 except that the projected regions were formed such that the shape of the cross section of each projected region was a rhombus in which $W_a$ was 20 μm and $W_b$ was 10 μm, the distance L between projected regions was 7 μm, and the height H of the projected regions was 3.5 μm.

The negative electrode active material layer was formed on the prepared negative electrode current collector in the same manner as in the negative electrode 2A, whereby the negative electrode 3A was prepared.

(ii) Negative Electrode 3B

A negative electrode current collector 3B was prepared in the same manner as in the negative electrode 3A except that the distance L between projected regions was changed to 10 μm, and the height H of the projected regions was changed to 5 μm.

The negative electrode active material layer was formed on the prepared negative electrode current collector 3B in the same manner as in the negative electrode 2A, whereby the negative electrode 3B was prepared.

(iii) Negative Electrode 3C

A negative electrode current collector 3C was prepared in the same manner as in the negative electrode 3A except that the distance L between projected regions was changed to 27 μm, and the height H of the projected regions was changed to 6 μm.

The negative electrode active material layer was formed on the prepared negative electrode current collector 3C in the same manner as in the negative electrode 2A, whereby the negative electrode 3C was prepared.

(iv) Negative Electrode 3D

A negative electrode current collector 3D was prepared in the same manner as in the negative electrode 3A except that the distance L between projected regions was changed to 30 μm, and the height H of the projected regions was changed to 6 μm.

The negative electrode active material layer was formed on the prepared negative electrode current collector 3D in the same manner as in the negative electrode 2A, whereby the negative electrode 3D was prepared.

The properties of the current collectors 3A to 3D used for the negative electrodes 3A to 3D are shown in Table 5, and the properties of the active material layers in the negative electrodes 3A to 3D are shown in Table 6.

TABLE 5

|  | Current collector 3A | Current collector 3B | Current collector 3C | Current collector 3D |
|---|---|---|---|---|
| $W_a$ of projected regions | 20 μm | 20 μm | 20 μm | 20 μm |
| $W_b$ of projected regions | 10 μm | 10 μm | 10 μm | 10 μm |
| Distance L between projected regions | 7 μm | 10 μm | 27 μm | 30 μm |
| Height H of projected regions | 3.5 μm | 5 μm | 6 μm | 6 μm |
| Distance $W_3$ between projected regions | 16 μm | 17 μm | 23 μm | 24 μm |
| Distance $W_4$ between projected regions | 16 μm | 17 μm | 23 μm | 24 μm |
| Angle α formed by $D_1$ and first line | 63° | 63° | 63° | 63° |
| Angle β formed by $D_2$ and second line | 63° | 63° | 63° | 63° |
| Area ratio of projected regions | 40% | 30% | 10% | 9% |
| Line segment ratio | 70% | 60% | 35% | 33% |
| Ratio (L/H) | 2 | 2 | 4.5 | 5 |
| Ratio ($W_a/W_b$) | 2 | 2 | 2 | 2 |

TABLE 6

|  | Negative electrode 3A | Negative electrode 3B | Negative electrode 3C | Negative electrode 3D |
|---|---|---|---|---|
| Composition of negative electrode active material | $SiO_{0.5}$ | $SiO_{0.5}$ | $SiO_{0.5}$ | $SiO_{0.5}$ |
| Size of negative electrode active material layer | 15 mm × 15 mm | 15 mm × 15 mm | 15 mm × 15 mm | 15 mm × 15 mm |
| Thickness t of negative electrode active material layer | 20 μm | 20 μm | 20 μm | 20 μm |
| Angle θ formed by growth direction of columnar particles and direction normal to surface of current collector | 0° | 0° | 0° | 0° |
| Porosity P of negative electrode active material layer | 32% | 34% | 35% | 32% |

The capacity retention rate after passage of 500 cycles of the battery 3A to 3D was measured in the same manner as in Example 1. The results are shown in Table 7.

TABLE 7

|  | Battery 3A | Battery 3B | Battery 3C | Battery 3D |
|---|---|---|---|---|
| Capacity retention rate | 64% | 73% | 75% | 62% |

From the results of the batteries 3A to 3D, it was found that when the ratio of an area of the projected regions relative to a total of the area of the projected regions and an area of the depression was 10 to 30%, the cycle characteristics were particularly excellent. Further, it was found that in a line segment drawn on the surface of the current collector such that the ratio of a total length of portions overlapping with the projected regions was maximized, when the ratio of the total length of the overlapping portions relative to the full length of the line segment was 35 to 60%, the cycle characteristics were particularly excellent.

On the other hand, the area ratio of the projected regions and the line segment ratio of the negative electrode 3A were high. This resulted in a low porosity of the active material layer including active material particles formed on the upper portion of the projected regions, causing adjacent active material particles to collide with each other during the expansion of the active material, and the active material particles to be separated from the current collector. Presumably, because of this, the cycle characteristics were slightly reduced.

The area ratio of the projected regions and the line segment ratio of the negative electrode 3D were low. This means that, in the oblique vapor deposition of the active material, since the area shaded by the projected regions was small, the active material was formed in a portion other than the projected regions, resulting in a low porosity P of the negative electrode active material layer. Presumably, because of this, also in negative electrode 3D, as in the case of the negative electrode 3A, adjacent active material particles collided with each other during the expansion of the active material, and the active material particles were separated from the current collector, causing the cycle characteristics to be slightly reduced.

Example 4

Next, an experiment was performed to determine an appropriate range of the height of the projected regions.

Negative electrodes 4A to 4E were prepared in the same manner as in Example 2 except that the shape and the height of the projected regions were changed as follows. Batteries 4A to 4E were fabricated in the same manner as in Example 1 except that the negative electrodes 4A to 4E were used.

(i) Negative Electrode 4A

A negative electrode current collector 4A was prepared in the same manner as in Example 1 except that the projected regions were formed such that the shape of the cross section of each projected region was a rhombus in which $W_a$ was 20 μm and $W_b$ was 10 μm, the distance L between projected regions was 18 μm, and the height H of the projected regions was 12 μm.

The negative electrode active material layer was formed on the prepared negative electrode current collector 4A in the same manner as in the negative electrode 2A, whereby the negative electrode 4A was prepared.

(ii) Negative Electrode 4B

The negative electrode 4B was prepared in the same manner as the negative electrode 4A except that the height H of the projected regions was changed to 9 μm.

(iii) Negative Electrode 4C

The negative electrode 4C was prepared in the same manner as the negative electrode 4A except that the height H of the projected regions was changed to 6 μm.

(iv) Negative Electrode 4D

The negative electrode 4D was prepared in the same manner as the negative electrode 4A except that the height H of the projected regions was changed to 3 μm.

(v) Negative Electrode 4E

The negative electrode 4E was prepared in the same manner as the negative electrode 4A except that the height H of the projected regions was changed to 2 μm.

The properties of the current collectors 4A to 4E used for the negative electrodes 4A to 4E are shown in Table 8, and the properties of the active material layers in the negative electrodes 4A to 4E are shown in Table 9.

TABLE 8

|  | Current collector 4A | Current collector 4B | Current collector 4C | Current collector 4D | Current collector 4E |
|---|---|---|---|---|---|
| $W_a$ of projected regions | 20 μm | 20 μm | 20 μm | 20 μm | 20 μm |
| $W_b$ of projected regions | 10 μm | 10 μm | 10 μm | 10 μm | 10 μm |
| Distance L between projected regions | 18 μm | 18 μm | 18 μm | 18 μm | 18 μm |
| Height H of projected regions | 12 μm | 9 μm | 6 μm | 3 μm | 2 μm |
| Distance $W_3$ between projected regions | 19 μm | 19 μm | 19 μm | 19 μm | 19 μm |
| Distance $W_4$ between projected regions | 19 μm | 19 μm | 19 μm | 19 μm | 19 μm |
| Angle α formed by $D_1$ and first line | 63° | 63° | 63° | 63° | 63° |
| Angle β formed by $D_2$ and second line | 63° | 63° | 63° | 63° | 63° |
| Area ratio of projected regions | 18% | 18% | 18% | 18% | 18% |
| Line segment ratio | 42% | 42% | 42% | 42% | 42% |
| Ratio (L/H) | 1.5 | 2 | 3 | 6 | 9 |
| Ratio ($W_a/W_b$) | 2 | 2 | 2 | 2 | 2 |

TABLE 9

|  | Negative electrode 4A | Negative electrode 4B | Negative electrode 4C | Negative electrode 4D | Negative electrode 4E |
|---|---|---|---|---|---|
| Composition of negative electrode active material | $SiO_{0.5}$ | $SiO_{0.5}$ | $SiO_{0.5}$ | $SiO_{0.5}$ | $SiO_{0.5}$ |

TABLE 9-continued

|  | Negative electrode 4A | Negative electrode 4B | Negative electrode 4C | Negative electrode 4D | Negative electrode 4E |
|---|---|---|---|---|---|
| Size of negative electrode active material layer | 15 mm × 15 mm | 15 mm × 15 mm | 15 mm × 15 mm | 15 mm × 15 mm | 15 mm × 15 mm |
| Thickness t of negative electrode active material layer | 20 μm | 20 μm | 20 μm | 20 μm | 20 μm |
| Angle θ formed by growth direction of columnar particles and direction normal to surface of current collector | 0° | 0° | 0° | 0° | 0° |
| Porosity P of negative electrode active material layer | 42% | 42% | 39% | 32% | 29% |

The capacity retention rate after passage of 500 cycles of the battery 4A to 4E was measured in the same manner as in Example 1. The results are shown in Table 10.

TABLE 10

|  | Battery 4A | Battery 4B | Battery 4C | Battery 4D | Battery 4E |
|---|---|---|---|---|---|
| Capacity retention rate | 82% | 82% | 80% | 72% | 60% |

From the results of the batteries 4A to 4E, it was found that when the ratio (L/H) of the distance L between projected regions adjacent to each other along the direction perpendicular to the maximum diameter $W_a$ of the projected regions relative to the height H of the projected regions was 6 or less, the cycle characteristics were particularly excellent.

On the other hand, in the battery 4E including the negative electrode 4E, the cycle characteristic was slightly reduced. In the current collector of the negative electrode 4E, the projected regions were short in height and the ratio (L/H) was great. This means that, in the oblique vapor deposition, since the area shaded by the projected regions was small, the active material was formed in a portion other than the projected regions, resulting in a low porosity of the active material layer. Presumably, because of this, in the negative electrode 4E, adjacent active material particles collided with each other during the expansion of the active material particles, and the active material particles were separated from the current collector, causing the cycle characteristics to be slightly reduced.

Batteries 4A and 4B demonstrated the same capacity retention rate. This was presumably attributable to the same porosity P of the negative electrodes 4A and 4B. The porosity P is determined by the area shaded by the projected regions in the oblique vapor deposition. When the ratio (L/H) is 2 or less, approximately same porosities are provided. The thickness including the projected regions of the negative electrode current collector 4A was 42 μm, and that of the negative electrode current collector 4B was 36 μm. Since the negative electrode current collector 4A was thicker than the negative electrode current collector 4B by 6 μm, the battery capacity per unit volume of the battery 4A was smaller than that of the battery 4B. For this reason, the ratio (L/H) is preferably 2 or more.

Example 5

In this example, the number of grain layers included in the columnar particles constituting the negative electrode active material layer was changed to give negative electrodes 5A to 5C. Batteries 5A to 5C were fabricated in the same manner as in Example 1 except that the negative electrodes 5A to 5C were used.

In the negative electrodes 5A to 5C, the negative electrode current collector 4C was used as the negative electrode current collector.

(i) Negative Electrode 5A

The negative electrode active material layer was formed basically in the same manner as in Example 2 except that the number of grain layers formed was changed to 30 layers. Specifically, the negative electrode active material layer was formed in the following manner.

The negative electrode current collector 4C was placed on the fixing table 91. The fixing table 91 was slanted so as to form an angle α of 60° with respect to the horizontal plane. The accelerating voltage of electron beams irradiated to the target 85 of silicon simple substance was set at −8 kV, and the emission of electron beams was set at 500 mA. The oxygen gas flow rate was set at 80 sccm. In this state, vapor deposition was performed for one minute, thereby to form a first grain layer.

Next, a second grain layer was formed on the first grain layer under the same conditions as described above except that the fixing table 91 was slanted so as to form an angle (180−α) of 120° with respect to the horizontal plane. Thereafter the angle of the fixing table was changed alternately between 60° and 120° to repeat the foregoing operation, whereby the negative electrode active material layer including a layered body as shown in FIG. 8 in which 30 grain layers were formed.

(ii) Negative Electrode 5B

The negative electrode 5B was prepared in the same manner as the negative electrode 5A except that the duration of vapor deposition was changed to 30 seconds. In the negative electrode 5B, the number of grain layers included in the layered body was 60 layers.

(iii) Negative Electrode 5C

The negative electrode 5C was prepared in the same manner as the negative electrode 5A except that the duration of vapor deposition was changed to 20 seconds. In the negative electrode 5C, the number of grain layers included in the layered body was 90 layers.

With respect to the negative electrodes 5A to 5C, the content of oxygen in the negative electrode active material layer thus formed was quantitated by a combustion method to determine a composition of the negative electrode active material composed of a compound containing silicon and oxygen. As the result, in any of the negative electrodes, the composition of the negative electrode active material was $SiO_{0.5}$. Further, the thickness of the active material layer (the height of the layered body) was 20 μm in any of the negative electrodes 5A to 5C.

The capacity retention rate after passage of 500 cycles of the batteries 5A to 5C was measured in the same manner as in Example 1. The results are shown in Table 11.

TABLE 11

|  | Battery 5A | Battery 5B | Battery 5C |
|---|---|---|---|
| Capacity retention rate | 80% | 81% | 80% |

From the results of the batteries 5A to 5C, it was found that excellent cycle characteristics were obtained irrespective of an increase of the number of grain layers included in the layered body.

INDUSTRIAL APPLICABILITY

The present invention can provide a high-capacity lithium secondary battery excellent, for example, in cycle characteristics. Such lithium secondary battery is applicable as a power source, for example, for portable electronic equipment.

The invention claimed is:

1. A negative electrode for a lithium secondary battery comprising a current collector and a negative electrode active material layer, wherein:
the current collector includes a depression and a plurality of projected regions defined by the depression,
said negative electrode active material layer includes a plurality of columnar particles, each of the columnar particles being carried on a corresponding one of the projected regions,
the projected regions are disposed two-dimensionally and regularly on the current collector, and
a ratio of an area of said projected regions relative to a total of the area of said projected regions and an area of said depression is 10 to 30%.

2. The negative electrode for a lithium secondary battery in accordance with claim 1, wherein in a line segment drawn on a surface of said current collector such that a ratio of a total length of portions overlapping with said projected regions is maximized, the total length is 35 to 60% of a full length of said line segment.

3. The negative electrode for a lithium secondary battery in accordance with claim 1, wherein
each of the projected regions has a maximum diameter $W_a$,
a distance L between said projected regions adjacent to each other along a first direction perpendicular to a second direction in which the maximum diameter $W_a$ lies, and a height H of said projected regions satisfy the following relation:

$2 \leq (L/H) \leq 6$.

4. The negative electrode for a lithium secondary battery in accordance with claim 1, wherein
each of the projected regions has a maximum diameter $W_a$ and a diameter $W_b$ in a first direction perpendicular to a second direction in which the maximum diameter $W_a$ lies, $W_b$ being a longest dimension along the first direction, and the maximum diameter $W_a$ and the diameter $W_b$ satisfy the following relation:

$1 \leq (W_a/W_b) \leq 4$.

5. The negative electrode for a lithium secondary battery in accordance with claim 4, wherein
said plurality of projected regions are arranged in a matrix along a plurality of first lines arranged in parallel and a plurality of second lines arranged in parallel, said first lines and said second lines intersecting with each other,
an angle α formed by one of said first lines and the first direction satisfies $45° \leq α < 90°$, and
an angle β formed by one of said second lines and the first direction satisfies $45° \leq β < 90°$.

6. The negative electrode for a lithium secondary battery in accordance with claim 1, wherein
said projected regions have a polygonal shape, a circular shape or an elliptic shape, in a plane parallel to a surface of the current collector.

7. The negative electrode for a lithium secondary battery in accordance with claim 6, wherein
the polygonal shape has a rounded corner.

8. The negative electrode for a lithium secondary battery in accordance with claim 1, wherein
said columnar particles include at least one selected from the group consisting of silicon simple substance, a silicon alloy, a compound containing silicon and oxygen, and a compound containing silicon and nitrogen.

9. The negative electrode for a lithium secondary battery in accordance with claim 8, wherein said silicon alloy is an alloy of silicon and metallic element M, and said metallic element M is an element incapable of forming an alloy with lithium.

10. The negative electrode for a lithium secondary battery in accordance with claim 9, wherein
said metallic element M is at least one selected from the group consisting of titanium, copper and nickel.

11. The negative electrode for a lithium secondary battery in accordance with claim 8, wherein
said compound containing silicon and oxygen is represented by the following general formula (1):

$SiO_x$       (1)

where $0 < x < 2$.

12. The negative electrode for a lithium secondary battery in accordance with claim 1, wherein
said columnar particles are slanted with respect to a direction normal to a surface of said current collector.

13. The negative electrode for a lithium secondary battery in accordance with claim 1, wherein
said columnar particles include a layered body composed of a plurality of grain layers grown in a slanted manner with respect to the direction normal to a surface of said current collector.

14. The negative electrode for a lithium secondary battery in accordance with claim 1, wherein
said plurality of grain layers are grown in directions different from one another.

15. A lithium secondary battery comprising the negative electrode in accordance with claim 1, a positive electrode including a positive electrode active material capable of absorbing and desorbing lithium ions, and an electrolyte with lithium ion conductivity.

* * * * *